(12) United States Patent
Chujoh et al.

(10) Patent No.: US 11,381,831 B2
(45) Date of Patent: *Jul. 5, 2022

(54) DECODING DEVICE AND ENCODING DEVICE

(71) Applicant: Kabushiki Kaisha Toshiba, Tokyo (JP)

(72) Inventors: Takeshi Chujoh, Kanagawa (JP); Tomoya Kodama, Kanagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/182,839

(22) Filed: Feb. 23, 2021

(65) Prior Publication Data

US 2021/0185335 A1 Jun. 17, 2021

Related U.S. Application Data

(63) Continuation of application No. 16/899,125, filed on Jun. 11, 2020, now Pat. No. 10,972,745, which is a
(Continued)

(51) Int. Cl.
*H04N 19/44* (2014.01)
*H04N 9/77* (2006.01)
(Continued)

(52) U.S. Cl.
CPC ........... *H04N 19/44* (2014.11); *H04N 7/0117* (2013.01); *H04N 9/64* (2013.01); *H04N 9/646* (2013.01);
(Continued)

(58) Field of Classification Search
CPC ........ H04N 19/44; H04N 7/0117; H04N 9/64; H04N 9/646; H04N 9/77; H04N 11/20;
(Continued)

(56) References Cited

U.S. PATENT DOCUMENTS 5,270,812 A 12/1993 Richards
5,333,010 A 7/1994 Nakamura et al.
(Continued)

FOREIGN PATENT DOCUMENTS

JP 2000-236547 A 8/2000
JP 2004-88795 A 3/2004
(Continued)

OTHER PUBLICATIONS

Office Action dated Jun. 7, 2016 for corresponding Japanese Application No. 2012-270314 and English translation thereof.
(Continued)

*Primary Examiner* — Paulos M Natnael
(74) *Attorney, Agent, or Firm* — Oblon, McClelland, Maier & Neustadt, L.L.P.

(57) ABSTRACT

According to an embodiment, a decoding device includes an acquiring unit configured to acquire first format information, encoded data, and first filter information, the first format information indicating a resolution of a color-difference component of the encoded data; a decoding unit configured to decode the encoded data to obtain a decoded image; and a converting unit configured to convert a color-difference formal of the decoded image represented by a first color-difference format by using a filter identified by the filter information.

2 Claims, 26 Drawing Sheets

Related U.S. Application Data continuation of application No. 16/256,324, filed on Jan. 24, 2019, now Pat. No. 10,728,566, which is a continuation of application No. 15/958,739, filed on Apr. 20, 2018, now Pat. No. 10,250,898, which is a continuation of application No. 15/680,039, filed on Aug. 17, 2017, now Pat. No. 9,998,747, which is a continuation of application No. 15/445,767, filed on Feb. 28, 2017, now Pat. No. 9,781,440, which is a continuation of application No. 14/028,687, filed on Sep. 17, 2013, now Pat. No. 9,621,867.

(51) Int. Cl.

| | | |
|---|---|---|
| *H04N 19/117* | (2014.01) | |
| *H04N 19/136* | (2014.01) | |
| *H04N 19/186* | (2014.01) | |
| *H04N 11/20* | (2006.01) | |
| *H04N 9/64* | (2006.01) | |
| *H04N 19/70* | (2014.01) | |
| *H04N 19/80* | (2014.01) | |
| *H04N 19/85* | (2014.01) | |
| *H04N 7/01* | (2006.01) | |
| *H04N 19/59* | (2014.01) | |

(52) U.S. Cl.
CPC ............... *H04N 9/77* (2013.01); *H04N 11/20* (2013.01); *H04N 19/117* (2014.11); *H04N 19/136* (2014.11); *H04N 19/186* (2014.11); *H04N 19/70* (2014.11); *H04N 19/80* (2014.11); *H04N 19/85* (2014.11); *H04N 19/59* (2014.11)

(58) Field of Classification Search
CPC .. H04N 19/117; H04N 19/136; H04N 19/186; H04N 19/70; H04N 19/80; H04N 19/85; H04N 19/59
See application file for complete search history.

(56) References Cited

U.S. PATENT DOCUMENTS

| | | | |
|---|---|---|---|
| 5,412,428 A | 5/1995 | Tahara | |
| 5,650,824 A | 7/1997 | Huang | |
| 5,819,035 A | 10/1998 | Devaney et al. | |
| 5,844,629 A | 12/1998 | Murray et al. | |
| 5,982,432 A | 11/1999 | Uenoyama | |
| 5,991,494 A | 11/1999 | Otsuka | |
| 6,262,771 B1 | 7/2001 | Higurashi | |
| 6,285,717 B1 | 9/2001 | Bahng et al. | |
| 6,342,950 B1 | 1/2002 | Tabata et al. | |
| 6,563,946 B2 | 5/2003 | Kato | |
| 6,614,489 B1 | 9/2003 | McIntyre | |
| 6,734,921 B1 | 5/2004 | McIntyre | |
| 6,829,301 B1 | 12/2004 | Tinker et al. | |
| 7,961,963 B2 | 6/2011 | Sun | |
| 8,275,207 B2 | 9/2012 | Okamoto et al. | |
| 9,237,325 B2* | 1/2016 | Chujoh | H04N 19/70 |
| 9,621,867 B2* | 4/2017 | Chujoh | H04N 19/186 |
| 9,749,646 B2 | 8/2017 | Zhu | |
| 9,781,440 B2* | 10/2017 | Chujoh | H04N 9/77 |
| 9,998,747 B2* | 6/2018 | Chujoh | H04N 19/70 |
| 10,250,898 B2* | 4/2019 | Chujoh | H04N 9/646 |
| 10,728,566 B2* | 7/2020 | Chujoh | H04N 19/80 |
| 10,972,745 B2* | 4/2021 | Chujoh | H04N 19/44 |
| 2006/0204221 A1 | 9/2006 | Uchida et al. | |
| 2009/0003435 A1 | 1/2009 | Cho et al. | |
| 2009/0074052 A1 | 3/2009 | Fukuhara | |
| 2009/0092326 A1 | 4/2009 | Fukuhara | |
| 2009/0231487 A1 | 9/2009 | Nakagawa et al. | |
| 2010/0142811 A1 | 6/2010 | Okamoto et al. | |
| 2010/0208989 A1 | 8/2010 | Narroschke | |
| 2011/0150080 A1 | 6/2011 | Watanabe et al. | |
| 2011/0200263 A1 | 8/2011 | Ogawa | |
| 2013/0188867 A1 | 7/2013 | Sato | |
| 2014/0085537 A1 | 3/2014 | Chujoh | |
| 2014/0218610 A1 | 8/2014 | Chujoh | |
| 2017/0171555 A1 | 6/2017 | Chujoh | |
| 2017/0347111 A1 | 11/2017 | Chujoh | |

FOREIGN PATENT DOCUMENTS

| | | |
|---|---|---|
| JP | 2005-12460 A | 1/2005 |
| JP | 2006-254232 A | 9/2006 |
| JP | 4057503 | 12/2007 |
| JP | 2009-246929 | 10/2009 |
| JP | 2010-531609 | 9/2010 |
| JP | 2011-083022 | 4/2011 |
| JP | 6125215 B2 | 5/2017 |
| WO | WO 2010/004726 | 1/2010 |
| WO | WO 2012/090334 A1 | 7/2012 |

OTHER PUBLICATIONS

4:2:2/4:2:0 Format Conversion Minimizing Color Difference Signal Degradation in Concatenated Operations-Filtering, SMPTE Recommended Practice, SMPTE RP 2050-1:2012,The Society of Motion Picture and Television Engineers, Approved Jan. 30, 2012, 11 pages.
U.S. Office Action dated Dec. 4, 2014, for U.S. Appl. No. 14/247,932.

* cited by examiner

FIG.5

| chroma_sampling (payloadSize) { | Descriptor |
|---|---|
| coded_format_idc | ue(v) |
| coded_data_bit_depth | ue(v) |
| target_format_idc | ue(v) |
| target_bit_depth | ue(v) |
| max_value | ue(v) |
| min_value | ue(v) |
| if((coded_format_idc == 1 && target_format_idc > 1) \|\| (coded_format_idc > 1 && target_format_idc==1)) { | |
|   progressive_flag | u(1) |
|   implicit_vertical_flag | u(1) |
|   if (implicit_vertical_flag == 1) | |
|     interpolation_vertical_idc | u(4) |
|   else { | |
|     tap_length_vertical_minus1 | ue(v) |
|     for (i=0;i< tap_length_vertical_minus1;i++) | |
|       ver_filter_coeff[i] | se(v) |
|     } | |
|   } | |
| if (((coded_format_idc ==1 \|\| coded_format_idc ==2) && target_format_idc ==3) \|\| (coded_format_idc ==3 && (target_format_idc ==1\|\| target_format_idc ==2))) { | |
|   implicit_horizontal_flag | u(1) |
|   if (implicit_horizontal_flag == 1) | |
|     interpolation_horizontal_idc | u(4) |
|   else { | |
|     tap_length_horizontal_minus1 | ue(v) |
|     for (i=0;i< =tap_length_horizontal_minus1;i++) | |
|       hor_filter_coeff[i] | se(v) |
|     } | |
|   } | |
| } | |

FIG.6

| VALUE | TAP LENGTH | FILTER COEFFICIENTS |
|---|---|---|
| 0 | 8 | -9, -27, 137, 563, 393, -23, 9, 0 |
| 1 | 8 | 47, -145, -64, 931, 1146, 239, -105, -1 |
| 2..15 | Reserved | |

FIG.7

| chroma_sampling (payloadSize) { | Descriptor |
|---|---|
| target_format_idc | ue(v) |
| if ((chroma_format_idc == 1 && target_format_idc > 1) \|\| (chroma_format_idc > 1 && target_format_idc==1)) { | |
| progressive_flag | u(1) |
| implicit_vertical_flag | u(1) |
| if (implicit_vertical_flag == 1) | |
| interpolation_vertical_idc | u(4) |
| else { | |
| tap_length_vertical_minus1 | ue(v) |
| for (i=0;i< tap_length_vertical_minus1;i++) | |
| ver_filter_coeff[i] | se(v) |
| } | |
| } | |
| if (((chroma_format_idc ==1 \|\| chroma_format_idc ==2) && target_format_idc ==3)) \|\| (chroma_format_idc ==3 && (target_format_idc ==1\|\| target_format_idc ==2))) { | |
| implicit_horizontal_flag | u(1) |
| if (implicit_horizontal_flag == 1) | |
| interpolation_horizontal_idc | u(4) |
| else { | |
| tap_length_horizontal_minus1 | ue(v) |
| for (i=0;i< =tap_length_horizontal_minus1;i++) | |
| hor_filter_coeff[i] | se(v) |
| } | |
| } | |
| } | |

FIG.8

| vui_parameters( ) { | Descriptor |
|---|---|
|    chroma_loc_info_present_flag | u(1) |
|    if( chroma_loc_info_present_flag ) { | |
|       chroma_sample_loc_type_top_field | ue(v) |
|       chroma_sample_loc_type_bottom_field | ue(v) |
|       chroma_filter_info_present_flag | u(1) |
|       if( chroma_filter_info_present_flag) | |
|          chroma_filter_info | u(8) |
|    } | |
| } | |

FIG.9

| Value | Tap length | Filter coefficients | Divisor | Phase shift | Purpose |
|---|---|---|---|---|---|
| 0 | Reserved | | | | |
| 1 | 8 | -3, -19, 34, 500, 500, 34, -19, -3 | 1024 | 1/2 | Down-sampling filter coefficients for 4:2:2 / 4:2:0 conversion for progressive source |
| | 4 | 19, 103, 1037, -136 | 1024 | 1/4 | Up-sampling filter coefficients for 4:2:0 / 4:2:2 conversion for Even Lines of progressive source (Reverse order coefficients for Odd Lines) |
| 2 | 8 | -8, -26, 115, 586, 409, -48, -4,0 | 1024 | -1/8 | Down-sampling filter coefficients for 4:2:2 / 4:2:0 conversion for the top field of interlace source (Reverse order coefficients for the bottom field) |
| | 4 | 24, -41, 1169, -128 | 1024 | 3/8 | Up-sampling filter coefficients for 4:2:0 / 4:2:2 conversion for Even Lines of the top field of interlace source (Reverse order coefficients for Odd Lines of the bottom field) |
| | 4 | -76, 783, 330, -13 | 1024 | -5/8 | Up-sampling filter coefficients for 4:2:0 / 4:2:2 conversion for Odd Lines of the top field of interlace source (Reverse order coefficients for Even Lines of the bottom field) |
| 3...255 | Reserved | | | | |

FIG.10

| Value | Tap length | Filter coefficients | Divisor | Phase shift | Purpose |
|---|---|---|---|---|---|
| 0 | Reserved | | | | |
| 1 | Explicit | | | | |
| 2 | 8 | -3, -19, 34, 500, 500, 34, -19, -3 | 1024 | 1/2 | Down-sampling filter coefficients for 4:2:2 / 4:2:0 conversion for progressive source |
| | 4 | 19, 103, 1037, -135 | 1024 | 1/4 | Up-sampling filter coefficients for 4:2:0 / 4:2:2 conversion for Even Lines of progressive source (Reverse order coefficients for Odd Lines) |
| 3 | 8 | -8, -26, 115, 586, 409, -48, -4, 0 | 1024 | -1/8 | Down-sampling filter coefficients for 4:2:2 / 4:2:0 conversion for the top field of interlace source (Reverse order coefficients for the bottom field) |
| | 4 | 24, -41, 1169, -128 | 1024 | 3/8 | Up-sampling filter coefficients for 4:2:0 / 4:2:2 conversion for Even Lines of the top field of interlace source (Reverse order coefficients for Odd Lines of the bottom field) |
| | 4 | -76, 783, 330, -13 | 1024 | -5/8 | Up-sampling filter coefficients for 4:2:0 / 4:2:2 conversion for Odd Lines of the top field of interlace source (Reverse order coefficients for Even Lines of the bottom field) |
| 4...255 | Reserved | | | | |

FIG.11

| chroma_sampling_filter_hint(payloadSize) { | Descriptor |
|---|---|
| target_format_idc | ue(v) |
| num_of_filter_minus1 | ue(v) |
| for ( i=0; i<=num_of_filter_minus1;i++) { | |
| tap_length_minus1 | ue(v) |
| for( j = 0; j <= tap_length_minus1; j ++) | |
| filter_coeff[j] | se(v) |
| } | |
| } | |

FIG.12

| vui_parameters( ) { | Descriptor |
|---|---|
| chroma_loc_info_present_flag | u(1) |
| if( chroma_loc_info_present_flag ) { | |
| chroma_sample_loc_type_top_field | ue(v) |
| chroma_sample_loc_type_bottom_field | ue(v) |
| chroma_filter_info_present_flag | u(1) |
| } | |
| } | |

FIG.13

| chroma_sampling_filter_hint(payloadSize) { | Descriptor |
|---|---|
|   num_of_filter_set_minus1 | |
|   for(i=0;i<=num_of_filter_set_minus1;i++) { | |
|     implicit_filter_set_flag | u(1) |
|     if (implicit_filter_set==1) | |
|       filter_set_idc | u(4) |
|     else { | |
|       num_of_filter_minus1 | ue(v) |
|       for (j=0; j<=num_of_filter_minus1;j++) { | |
|         implicit_filter_flag | u(1) |
|         if( implicit_filter_flag == 1 ) | |
|           filter_idc | u(4) |
|         else { | |
|           tap_length_minus1 | ue(v) |
|           for( k = 0, k <= tap_length_minus1; k++) | |
|             filter_coeff[k] | se(v) |
|         } | |
|       } | |
|     } | |
|   } | |
| } | |

FIG.14

| filter_Set_idc | filter_idc | Tap length | Filter coefficients | Divisor | Phase shift | Purpose |
|---|---|---|---|---|---|---|
| 0 | 0 | 8 | -3, -19, 34, 500, 500, 34, -19, -3 | 1024 | 1/2 | Down-sampling filter coefficients for 4:2:2 / 4:2:0 conversion for progressive source |
|  | 1 | 4 | 19, 103, 1037, -135 | 1024 | 1/4 | Up-sampling filter coefficients for 4:2:0 / 4:2:2 conversion for Even Lines of progressive source (Reverse order coefficients for Odd Lines) |
| 1 | 2 | 8 | -8, -26, 115, 586, 409, -48, -4, 0 | 1024 | -1/8 | Down-sampling filter coefficients for 4:2:2 / 4:2:0 conversion for the top field of interlace source (Reverse order coefficients for the bottom field) |
|  | 3 | 4 | 24, -41, 1169, -128 | 1024 | 3/8 | Up-sampling filter coefficients for 4:2:0 / 4:2:2 conversion for Even Lines of the top field of interlace source (Reverse order coefficients for Odd Lines of the bottom field) |
|  | 4 | 4 | -76, 783, 330, -13 | 1024 | -5/8 | Up-sampling filter coefficients for 4:2:0 / 4:2:2 conversion for Odd Lines of the top field of interlace source (Reverse order coefficients for Even Lines of the bottom field) |
| 2 | 5 | 7 | -29, 0, 88, 138, 88, 0, -29 | 256 | 0 | Down-sampling filter coefficients for 4:4:4 / 4:2:2 conversion |
|  | 6 | 4 | -3, 35, 35, -3 | 64 | 1/2 | Up-sampling filter coefficients for 4:2:2 / 4:4:4 conversion |
| 3..15 | 7..15 | Reserved |  |  |  |  |

FIG.15

| | Descriptor |
|---|---|
| chroma_sampling_filter_hint(payloadSize) { | |
|   target_format_idc | ue(v) |
|   if( (chroma_format_idc == 1 && target_format_idc > 1) \|\| | |
|     (chroma_format_idc > 1 && target_format_idc == 1) ) { | |
|     implicit_vertical_flag | u(1) |
|     if( implicit_vertical_flag == 1 ) | |
|       vertical_filter_idc | u(4) |
|     else { | |
|       tap_length_vertical_minus1 | ue(v) |
|       for( i = 0; i <= tap_length_vertical_minus1;i++) | |
|         ver_filter_coeff[i] | se(v) |
|     } | |
|     second_filter_flag | u(1) |
|     if( second_filter_flag && | |
|       chroma_format_idc == 1 && target_format_idc > 1 ) | |
|       if( implicit_vertical_flag == 1 ) | |
|         second_vertical_filter_idc | u(4) |
|       else { | |
|         tap_length_second_vertical_minus1 | ue(v) |
|         for( i = 0; i <= tap_length_second_vertical_minus1;i++) | |
|           second_ver_filter_coeff[i] | se(v) |
|       } | |
|   } | |
|   if( ((chroma_format_idc == 1 \|\| chroma_format_idc == 2) && | |
|     target_format_idc == 3)) \|\| | |
|     (chroma_format_idc == 3 && | |
|     (target_format_idc == 1\|\| target_format_idc == 2))) { | |
|     implicit_horizontal_flag | u(1) |
|     if( implicit_horizontal_flag == 1 ) | |
|       horizontal_filter_idc | u(4) |
|     else { | |
|       tap_length_horizontal_minus1 | ue(v) |
|       for( i = 0; i <= tap_length_horizontal_minus1;i++) | |
|         hor_filter_coeff[i] | se(v) |
|     } | |
|   } | |
| } | |

FIG.16

| filter_idc | Tap length | Filter coefficients | Divisor | Phase shift | Purpose |
|---|---|---|---|---|---|
| 0 | 8 | -3, -19, 34, 500, 500, 34, -19, -3 | 1024 | 1/2 | Down-sampling filter coefficients for 4:2:2 / 4:2:0 conversion for progressive source |
| 1 | 4 | 19, 103, 1037, -135 | 1024 | 1/4 | Up-sampling filter coefficients for 4:2:0 / 4:2:2 conversion for Even Lines of progressive source (Reverse order coefficients for Odd Lines) |
| 2 | 8 | -8, -26, 115, 586, 409, -48, -4, 0 | 1024 | -1/8 | Down-sampling filter coefficients for 4:2:2 / 4:2:0 conversion for the top field of interlace source (Reverse order coefficients for the bottom field) |
| 3 | 4 | 24, -41, 1169, -128 | 1024 | 3/8 | Up-sampling filter coefficients for 4:2:0 / 4:2:2 conversion for Even Lines of the top field of interlace source (Reverse order coefficients for Odd Lines of the bottom field) |
| 4 | 4 | -76, 783, 330, -13 | 1024 | -5/8 | Up-sampling filter coefficients for 4:2:0 / 4:2:2 conversion for Odd Lines of the top field of interlace source (Reverse order coefficients for Even Lines of the bottom field) |
| 5 | 7 | -29, 0, 88, 138, 88, 0, -29 | 256 | 0 | Down-sampling filter coefficients for 4:4:4 / 4:2:2 conversion |
| 6 | 4 | -3, 35, 35, -3 | 64 | 1/2 | Up-sampling filter coefficients for 4:2:2 / 4:4:4 conversion |
| 7..15 | Reserved | | | | |

FIG.17

| chroma_sampling_filter_hint(payloadSize) { | Descriptor |
|---|---|
|   target_format_idc | ue(v) |
|   if( (chroma_format_idc = = 1 && target_format_idc > 1) \|\| | |
|     (chroma_format_idc > 1 && target_format_idc = = 1) ) { | |
|     tap_length_vertical_minus1 | ue(v) |
|     for( i = 0; i <= tap_length_vertical_minus1; i++) | |
|       ver_filter_coeff[i] | se(v) |
|     second_filter_flag | u(1) |
|     if( second_filter_flag && | |
|       chroma_format_idc = = 1 && target_format_idc > 1 ) | |
|     tap_length_second_vertical_minus1 | ue(v) |
|     for( i = 0; i <= tap_length_second_vertical_minus1; i++) | |
|       second_ver_filter_coeff[i] | se(v) |
|   } | |
|   if( ((chroma_format_idc = =1 \|\| chroma_format_idc = = 2) && | |
|     target_format_idc = = 3)) \|\| | |
|     (chroma_format_idc = = 3 && | |
|     (target_format_idc = = 1\|\| target_format_idc = = 2))) { | |
|     tap_length_horizontal_minus1 | ue(v) |
|     for( i = 0; i <= tap_length_horizontal_minus1; i++) | |
|       hor_filter_coeff[i] | se(v) |
|   } | |
| } | |

DECODING DEVICE AND ENCODING DEVICE

CROSS-REFERENCE TO RELATED APPLICATION

This application is a continuation application of U.S. application Ser. No. 16/899,125 filed Jun. 11, 2020, which is a continuation application of U.S. application Ser. No. 16/256,324 filed Jan. 24, 2019, which is a continuation application of U.S. application Ser. No. 15/958,739 filed Apr. 20, 2018, which is a continuation application of U.S. application Ser. No. 15/680,039 filed Aug. 17, 2017, which is a continuation application of U.S. application Ser. No. 15/445,767, filed Feb. 28, 2017, which is a continuation application of U.S. application Ser. No. 14/028,687 (now U.S. Pat. No. 9,621,867), filed Sep. 17, 2013, which is based upon and claims the benefit of priority from Japanese Patent Application Nos. 2012-208837, filed on Sep. 21, 2012 and 2012-270314, filed on Dec. 11, 2012; the entire contents of each of which are incorporated herein by reference.

FIELD

Embodiments described herein relate generally to a decoding device and an encoding device.

BACKGROUND

Regarding an image having a luminance component and a color-difference component, the image is sometimes encoded after converting a resolution of the color-difference component. In the same manner, the image is decoded after converting the resolution of the color-difference. The resolution of the color-difference component has various formats such as a 4:4:4 format, a 4:2:2 format, and a 4:2:0 format.

If resolution conversion is performed repeatedly with respect to the color-difference component, it leads to deterioration of the image. For that reason, in the past, there have been attempts to suppress the image deterioration. More particularly, a technology has been disclosed in which a filter that meets the conditions for suppressing the image deterioration is designed as the filter to be used in performing resolution conversion with respect to the color-difference component.

However, in the past, image deterioration occurs depending on the resolution of the color-difference component of the image to be output.

BRIEF DESCRIPTION OF THE DRAWINGS

FIG. 5 is a diagram illustrating an exemplary syntax of color-difference conversion information;

FIG. 6 is a schematic diagram illustrating an exemplary data structure of definition information;

FIG. 7 is a diagram illustrating another exemplary syntax of the color-difference conversion information;

FIG. 8 is a diagram illustrating still another exemplary syntax of the color-difference conversion information;

FIG. 9 is a diagram illustrating an example of the data structure of color-difference conversion filter definition information;

FIG. 10 is a diagram of another example of the data structure of e color-difference conversion filter definition information;

FIG. 11 is a diagram illustrating an exemplary syntax of color-difference conversion filter information;

FIG. 12 is a diagram illustrating still another exemplary syntax of the color-difference conversion information;

FIG. 13 is a diagram illustrating another exemplary syntax of the color-difference conversion filter information;

FIG. 14 is a diagram illustrating still another example of the data structure of the color-difference conversion filter definition information;

FIG. 15 is a diagram illustrating still another exemplary syntax of the color-difference conversion filter information;

FIG. 16 is a diagram illustrating still another example of the data structure of the color-difference conversion filter definition information;

FIG. 17 is a diagram illustrating still another exemplary syntax of the color-difference conversion filter information;

DETAILED DESCRIPTION

According to an embodiment, a decoding device includes an acquiring unit configured to acquire first format information, encoded data, and first filter information, the first format information indicating a resolution of a color-difference component of the encoded data; a decoding unit configured to decode the encoded data to obtain a decoded image; and a converting unit configured to convert a color-difference format of the decoded image represented by a first color-difference format by using a filter identified by the filter information.

Figure 32:
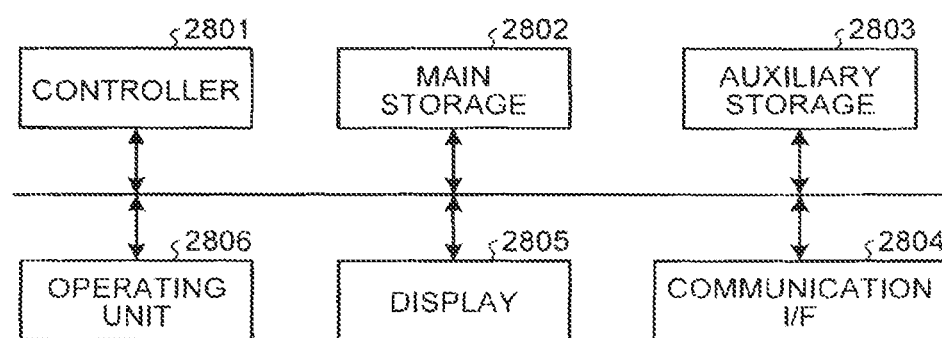
FIG. 32 is a hardware configuration diagram.

Next, a hardware configuration of the device (the decoding device, and the encoding device) according to the present embodiment will be described with reference to FIG. 32. FIG. 32 is an explanatory view illustrating a hardware configuration of the device according to each of the embodiments. The decoding device, and the encoding device each comprise a control unit 2801, such as a CPU (Central Processing Unit) which controls the overall device, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the decoding device, and the encoding device are connected wirelessly or through a wire to a communication I/F (Interface) 2804 which controls communication with an external device, a display 2805 which displays information, and an operating unit 2806, such as a keyboard or a mouse which receives instructions input by the user. Data to be encoded and data to be decoded may be stored in the HDD, or input by the disk drive device, or input externally via the communication I/F 2804.

The hardware configuration illustrated in FIG. 32 is a mere example. The decoding device, and the encoding device of each embodiment may be implemented partly or entirely by an integrated circuit such as an LSI (Large Scale Integration) circuit or an IC (Integrated Circuit) chip set. The functional blocks of the decoding device and the encoding device may be individually formed as a processor, or may be integrated partly or entirely as a processor. Integration of the circuits of the configuration is not limited to an LSI, but may be implemented as a dedicated circuit or a general-purpose processor.

The functional configuration of the device (the decoding device, and the encoding device) will be described in detail below.

First Embodiment

Figure 1:
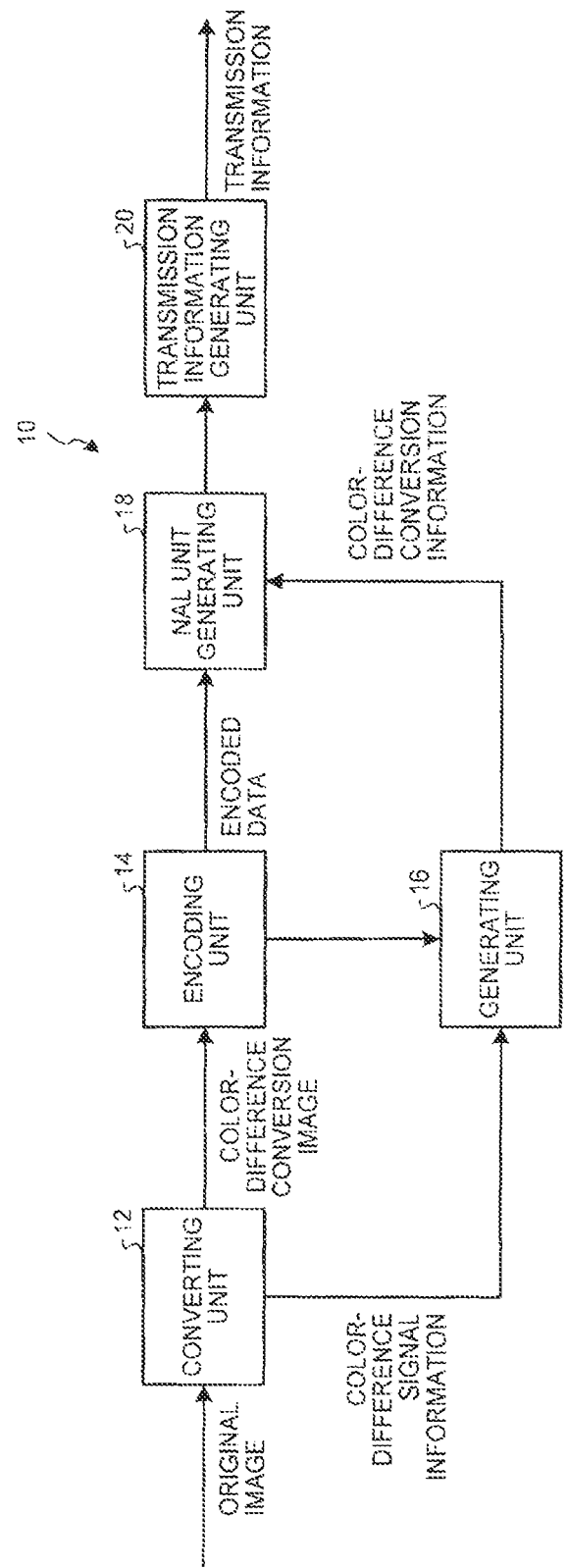
FIG. 1 is a schematic diagram illustrating an encoding device according to a first embodiment.

FIG. 1 is a schematic diagram illustrating an encoding device 10 according to a first embodiment.

The encoding device 10 performs encoding after changing the resolution of the color-difference component of an original image. Herein, the original image contains the luminescence component and the color-difference component. The resolution of the color-difference component has various color-difference formats such as the 4:4:4 format, the 4:2:2 format, and the 4:2:0 format. An original image having any one of those color-difference formats is input to the encoding device 10.

The explanation is given for an example in which an original image that has the 4:4:4 format as the color-difference format is input to the encoding device 10. However, that is not the only possible case.

The encoding device 10 includes a converting unit 12, an encoding unit 14, a generating unit 16, a NAL unit generating unit 18, and a transmission information generating unit 20.

The convening unit 12 performs filter processing with respect to an original image so as to perform resolution conversion with respect to the color-difference component of the original image. Then, the converting unit 12 outputs the original image that has the converted resolution of the color-difference component as a color-difference conversion image. The explanation is given for a case in which the converting unit 12 increases the resolution of the color-difference component (i.e., performs up-sampling) of an original image.

Figure 2:
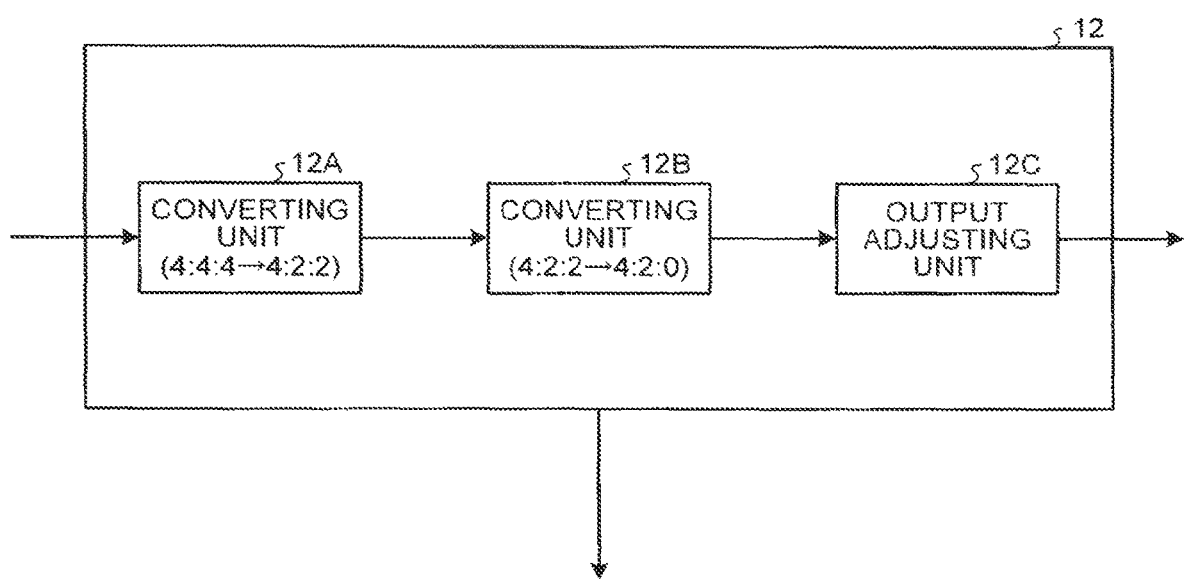
FIG. 2 is a schematic diagram illustrating a converting unit in the encoding device according to the first embodiment.

FIG. 2 is a schematic diagram illustrating the converting unit 12.

The convening unit 12 includes one or more converting units that convert resolution of the color-difference component of an original image that is input to the encoding device 10. Meanwhile, resolution conversion performed by the converting unit 12 with respect to the color-difference component is sometimes referred to as color-difference format conversion. The converting unit 12 includes a converting unit 12A, a converting unit 12B, and an output adjusting unit 12C.

The converting unit 12A converts the original image having the 4:4:4 format into an image having the 4:2:2 format. More specifically, with respect to the color-difference component of each pixel constituting the original image having the 4:4:4 format, the converting unit 12A performs filter processing using a filter that decimates the color-difference component to half in the horizontal direction. That is, the converting unit 12A performs down-sampling that decimates the color-difference component of the pixels, which constitute the original image having the 4:4:4 format, to half in the horizontal direction and converts the original image into an image having the 4:2:2 format. Then, the converting unit 12A outputs the image having the 4:2:2 format to the converting unit 12B.

Thus, the converting unit 12B receives an image having the 4:2:2 format from the converting unit 12A. Then, the converting unit 12B converts the image having the 4:2:2 format into an image having the 4:2:0 format. More specifically, with respect to the color-difference component of each pixel constituting the image having the 4:2:2 format, the converting unit 12B performs filter processing using a filter that decimates the color-difference component to half in the vertical direction. That is, the converting unit 12B performs down-sampling that decimates the color-difference component of the pixels, which constitute the image having the 4:2:2 format, to half in the vertical and converts that image into an image having the 4:2:0 format. Then, the converting unit 12B outputs the image having the 4:2:0 format to the output adjusting unit 12C.

Then, the output adjusting unit 12C performs a clipping operation so as to ensure that the value of each pixel constituting the received image, which has the 4:2:0 format and which is received from the converting unit 12B, falls in a range between the smallest value and the largest value set according to a standard. Then, to the encoding unit 14, the output adjusting unit 12C outputs the post-clipping image as a color-difference conversion image that has been subjected to color-difference conversion in the converting unit 12. Thus, the color-difference conversion image points to the original image after the converting unit 12 has converted resolution of the color-difference component.

Returning to the explanation with reference to FIG. 1, the converting unit 12 outputs the color-difference conversion image to the encoding unit 14. Moreover, the converting unit 12 outputs color-difference signal information to the generating unit 16.

The color-difference signal information contains filter information that is used in filter processing performed by the converting unit 12. The color-difference signal information contains the following: the original image that has the 4:4:4 format and that is received by the converting unit 12A; filter information that is used in filter processing performed by the converting unit 12A; the image that has the 4:2:2 format and that is received by the converting unit 12B; and filter information that is used in filter processing performed by the converting unit 12B.

The filter information used in filter processing performed by the converting unit 12A is horizontal down-sampling filter information. Similarly, the filter information used in filter processing performed by the converting unit 12B is vertical down-sampling filter information.

The encoding unit 14 receives a color-difference conversion image from the converting unit 12. Then, the encoding unit 14 encodes the color-difference conversion image and generates encoded data. The encoding unit 14 divides a single frame into slices each of which is made of a plurality of pixel areas, and performs encoding on a slice-by-slice basis.

Figure 3:
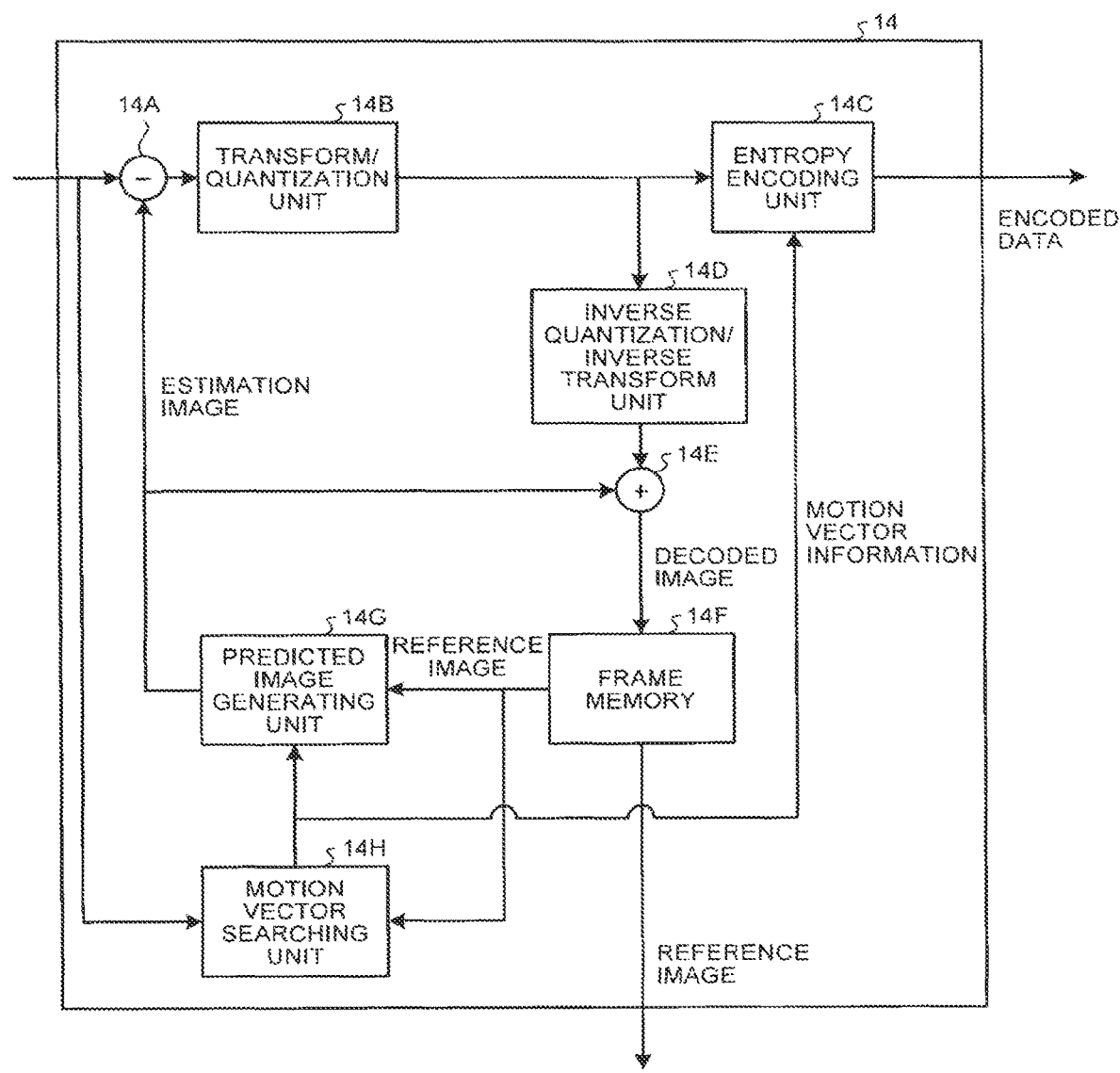
FIG. 3 is a schematic diagram illustrating an encoding unit in the encoding device according to the first embodiment.

FIG. 3 is a schematic diagram illustrating the encoding unit 14.

The encoding unit 14 includes a subtracting unit 14A, a transform/quantization unit 14B, an entropy encoding unit 14C, an inverse quantization/inverse transform unit 14D, an adding unit 14E, a frame memory 14F, a predicted image generating unit 14G, and a motion vector searching unit 14H.

The subtracting unit 14A receives a color-difference conversion image from the convening unit 12. Then, the subtracting unit 14A obtains the difference between the color-difference conversion image and a predicted image, which is generated by the predicted image generating unit 14G; and generates an error image representing that difference.

The transform/quantization unit 14B performs transform with respect to the error image to generate transform coefficients, and quantizes the transform coefficients to generate quantized coefficients. Examples of the method for performing transform with respect to the error image include orthogonal transformation using the discrete cosine transform (DCT), wavelet transform, and independent component analysis. The transform/quantization unit 4B performs conversion with respect to the error image by implementing any one of those methods. Moreover, the transform/quantization unit 14B quantizes the transform coefficients using a quantization parameter set in advance.

Then, the transform/quantization unit 14B outputs the quantized coefficients to the entropy encoding unit 14C and the inverse quantization/inverse transform unit 14D.

Thus, the entropy encoding unit 14C receives the quantized coefficients from the transform/quantization unit 14B. Moreover, the entropy encoding unit 14C receives motion vector information from the motion vector searching unit 14H (described later). Then, the entropy encoding unit 14C performs entropy encoding with respect to the quantized coefficients and the motion vector information according to a predetermined syntax, and generates encoded data. Herein, the syntax points to the setting rules regarding the encoded data.

Meanwhile, the entropy encoding unit 14C performs entropy encoding using, for example, Huffman encoding or arithmetic encoding.

Then, the entropy encoding unit 14C outputs the generated encoded data to the NAL unit generating unit 18.

The inverse quantization/inverse transform unit 14D performs inverse quantization with respect to the quantized coefficients and then performs inverse transform to generate an error image. That is, with respect to the quantized coefficients, the inverse quantization/inverse transform unit 14D performs opposite processing to the processing performed by the transform/quantization unit 14B. More particularly, when the transform/quantization unit 14B performs wavelet transform and quantization in that order, the inverse quantization/inverse transform unit 14D performs inverse quantization and inverse wavelet transform in that order.

The adding unit 14E receives the error image from the inverse quantization/inverse transform unit 14D and receives the predicted image from the predicted image generating unit 14G. Then, the adding unit 14E adds the error image and the predicted image to obtain a decoded image. Subsequently, the decoded image is stored in the frame memory 14F.

The frame memory 14F performs filter processing with respect to the decoded image and stores it as a reference image. Then, the frame memory 14F outputs the reference image to the predicted image generating unit 14G and the motion vector searching unit 14H.

The motion vector searching unit 14H generates motion vector information by referring to the color-difference conversion image received from the converting unit 12 and the reference image received from the frame memory 14F. Then, the motion vector searching unit 14H outputs the motion vector information to the predicted image generating unit 14G and the entropy encoding unit 14C.

The predicted image generating unit 14G generates a predicted image by referring to the reference image and the motion vector information. Then, the predicted image generating unit 14G outputs the predicted image to the adding unit 14E and the subtracting unit 14A.

Meanwhile, the reference image generated by the frame memory 14F has the same color-difference format as that of the color-difference conversion image. That is, the reference image has the 4:2:0 format, which is the same as the color-difference format of the color-difference conversion image obtained when the converting unit 12 performs resolution conversion with respect to the color-difference component. The frame memory 14F outputs the reference image, which has the 4:2:0 formation, to the generating unit 16.

Returning to the explanation with reference to FIG. 1, the generating unit 16 receives the color-difference signal information from the converting unit 12. Moreover, the generating unit 16 receives, from the encoding unit 14, the reference image having the same color-difference format (i.e., the 4:2:0 format) as the format of the color-difference conversion image. Then, the generating unit 16 generates color-difference conversion information by referring to the color-difference signal information and the reference image having the color-difference format of the color-difference conversion image.

The color-difference conversion information contains a first color-difference format, and contains filter information of the filter used to convert the color-difference format of a decoded image that is obtained by decoding the encoded data.

The explanation is given for an example in which the color-difference conversion format contains the first color-difference format, a second color-difference format, and the filter information.

The first color-difference format indicates the resolution of the color-difference component of the encoded data, that is, indicates the color-difference format of the encoded data obtained by the encoding unit 14 by means of encoding. In other words, the first color-difference format is the color-difference format of a color-difference conversion image. The first color-difference format points to the 4:2:0 format. Meanwhile, in the following explanation, the resolution of the color-difference component is sometimes simply referred to as the color-difference format.

The second color-difference format is a color-difference format in which the decoded image of the encoded data is output. More particularly, the second color-difference format is used to reproduce the decoded image obtained by decoding the encoded data. The second color-difference format is determined depending on the mode of reproduction, the type of the reproducing device, etc. The second color-difference formation is set in advance in the generating unit 16. Alternatively, the second color-difference format may be received by the encoding device 10 along with the original image. Still alternatively, the second color-difference format may be received from an external device via a communication unit (not illustrated).

The filter information is including information to specify the filter. Or the filter information is including a filter coefficient. In this embodiment, the filter information is used to identify a filter that is used in converting color-difference format of a decoded image.

The explanation is given for an example in which the filter information is used to identify a filter that is used in converting a decoded image having the first color-difference format into a decoded image having the second color-difference format. Thus, the explanation is given for an example in which the filter information is information that is used while converting a decoded image having the first color-difference format into a decoded image having the second color-difference format. The filter information contains, for example, filter coefficients.

Moreover, the filter information may also contain information for the second color-difference format. Herein, the filter information may be information such as a flag that is used to identify the second color-difference format, or may be the second color-difference format itself.

Figure 4:
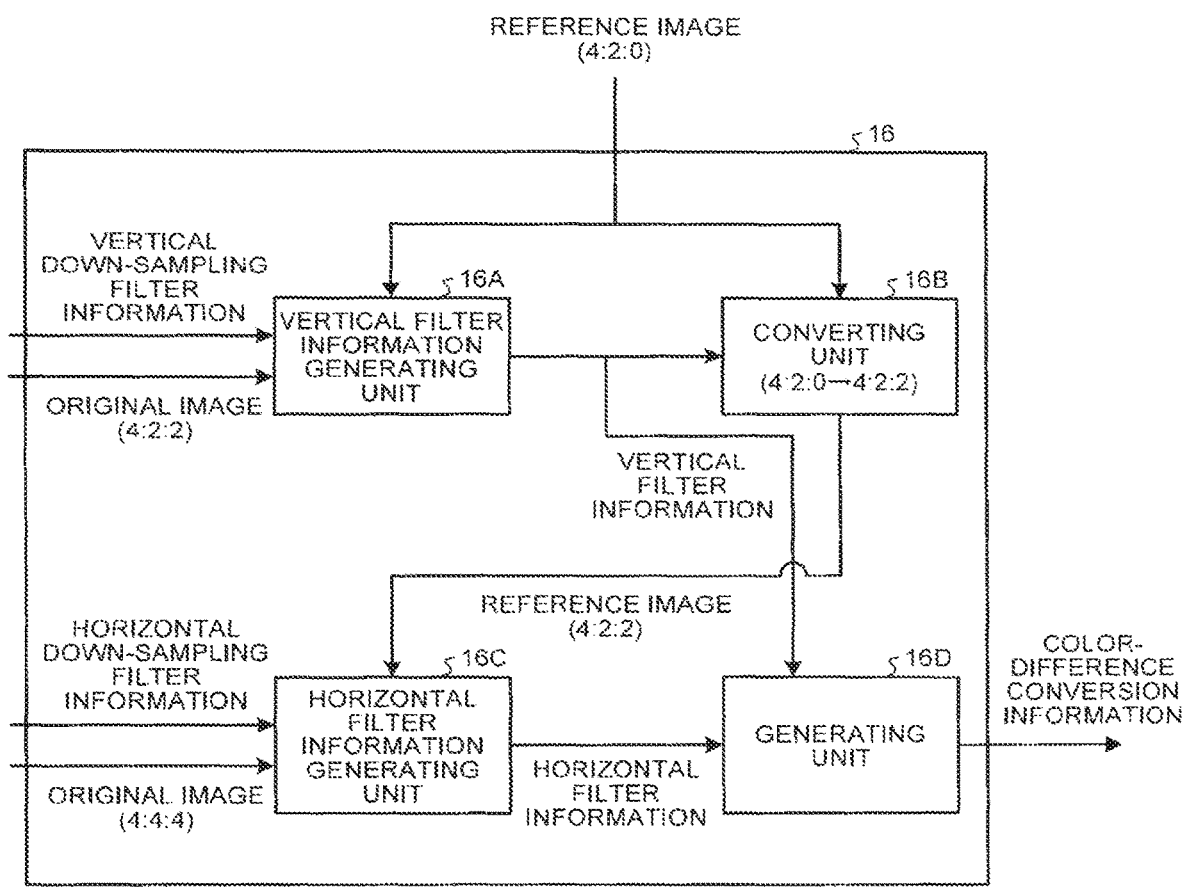
FIG. 4 is a schematic diagram illustrating a generating unit in the encoding device according to the first embodiment.

FIG. 4 is a schematic diagram illustrating the generating unit 16.

The generating unit 16 receives color-difference signal information from the converting unit 12. Moreover, the generating unit 16 receives, from the encoding unit 14, a reference image having the same color-difference format (i.e., the 4:2:0 format) as the format of the color-difference conversion image.

As described above, the color-difference signal information contains the following: the original image that has the 4:4:4 format and that is received by the converting unit 12A; filter information that is used in filter processing performed by the converting unit 12A; the image that has the 4:2:2 format and that is received by the converting unit 12B; and filter information that is used in filter processing performed by the converting unit 12B.

The generating unit 16 includes a vertical filter information generating unit 16A, a converting unit 16B, a horizontal filter information generating unit 16C, and a generating unit 16D.

The vertical filter information generating unit 16A receives, from the color-difference signal information, the image having the 4:2:2 format and the filter information used in filter processing performed by the converting unit 12B (i.e., vertical down-sampling filter information). Moreover, the vertical filter information generating unit 16A receives, from the encoding unit 14, a reference image having the same color-difference format (i.e., the 4:2:0 format) as the format of the color-difference conversion image.

Then, the vertical filter information generating unit 16A refers to the image having the 4:2:2 format, refers to vertical down-sampling filter information used in filter processing performed by the converting unit 12B, and refers to the reference image having the 4:2:0 format that is the image having the color-difference format after the conversion performed by the converting unit 12B; and designs filter information that is used in converting an image having the 4:2:0 format into an image having the 4:2:2 format.

That is, the vertical filter information generating unit 16A performs vertical up-sampling with respect to the reference image having the 4:2:0 format, and designs filter information to be used in obtaining an image having the 4:2:2 format. Then, the vertical filter information generating unit 16A outputs vertical filter information, which is the filter information that has been designed, to the converting unit 16B and the generating unit 16D.

While designing the filter information, Equations (1) to (3) given below are used.

$$F = (f_1 f_2 + z, 999 \, f_n) \quad (1)$$

$$S_F(x) = \sum_{i=0}^{n} f_i S(x+i) \quad (2)$$

$$\frac{\partial}{\partial f_i} \left( \sum_{x \in X} (S_F(x) - S_{org}(x))^2 \right) = 0 \quad (3)$$

Herein, Equations (1) to (3) are formulae tier calculating a filter corresponding to the least mean square of the difference between the color-difference component of a pre-filter-processing image and the color-difference component of a post-filter-processing image. That is, Equations (1) to (3) are formulae for calculating a Wiener filter.

In Equation (1), F represents a filter coefficient set; $f_1$ to $f_n$ represent filter coefficients; and n is an integer equal to or greater than one.

In Equation (2), S represents the color-difference component of a post-filter-processing image; and x represents the position of a pixel. In Equations (2) and (3), $S_F(x)$ represents a post-filter-processing image signal. In Equation (3), $S_{org}$ represents the color-difference component of a pre-filter-processing image.

The converting unit 16B receives, from the encoding unit 14, the reference image having the same color-difference format (i.e., the 4:2:0 format) as the format of the color-difference conversion image. Moreover, the converting unit 16B receives the vertical filter information from the vertical filter information generating unit 16A.

Then, the converting unit 16B performs filter processing using the vertical filter information and converts the reference image, which has the same color-difference format (i.e., the 4:2:0 format) as the format of the color-difference conversion image, into an image having the 4:2:2 format. Then, the converting unit 16B outputs the image having the 4:2:2 format to the horizontal filter information generating unit 16C.

The horizontal filter information generating unit 16C receives, from the color-difference signal information, the original image that has the 4:4:4 format and that is received by the converting unit 12A; and the filter information used in filter processing performed by the converting unit 12A (i.e., the horizontal down-sampling filter information). Moreover, the horizontal filter information generating unit ICC receives the image having the 4:2:2 from the converting unit 16B.

The horizontal filter information generating unit ICC refers to the image having the 4:4:4 format, refers to the horizontal down-sampling filter information, and refers to the image having the 4:2:2 format; and designs filter information that is used in converting an image having the 4:2:2 format into an image having the 4:4:4 format. While designing the filter information, Equations (1) to (3) given above are used.

That is, the horizontal filter information generating unit 16C performs horizontal up-sampling with respect to the reference image having the 4:2:2 format, and designs filter information to be used in obtaining an image having the 4:4:4 format. Then, the horizontal filter information generating unit 16C outputs horizontal filter information, which is the filter information that has been designed, to the generating unit 16D.

The generating unit 16D generates color-difference conversion information. More specifically, as the first color-difference format of the encoded data encoded by the encoding unit 14, the generating unit 16D uses the color-difference format of the reference image received by the encoding unit 14 (i.e., the 4:2:0 format). Moreover, the generating unit 16D reads, from a memory (not illustrated), the second color-difference format that is used when a decoded image that is obtained by decoding the encoded data is output. Furthermore, as the filter information, the generating unit 16D makes use of the vertical filter information, which is received from the vertical filter information generating unit ISA, and makes use of the horizontal filter information, which is received from the horizontal filter information generating unit 16C. Then, the generating unit 16D generates the color-difference conversion information that contains the first color-difference format, the second color-difference format, and the filter information.

Herein, the generating unit 16D generates the color-difference conversion information according to predetermined setting rules (syntax).

FIG. 5 is a diagram illustrating an exemplary syntax of the color-difference conversion information.

As illustrated in FIG. 5, the color-difference conversion information contains coded_format_idc, coded_data_bit_depth, target_format_idc, target_bit_depth, max_value, min_value, progressive_flag, implicit_vertical_flag, tap_length_vertical_minus1, ver_filter_coeff, implicit_horizontal_flag, interpolation_horizontal_idc, tap_length_horizontal_minus1, and hor_filter_coeff.

Herein, coded_format_idc represents the first color-difference format.

For example, when the value of coded_format_idc is equal to "0", it indicates that the first color-difference format is a monochrome format having only the luminescence specified. However, when the value of coded_format_idc is equal to "1", it indicates that the first color-difference format is the 4:2:0 format. Moreover, when the value of coded_format_idc is equal to "2", it indicates that the first color-difference format is the 4:2:2 format. Furthermore, when the value of coded_format_idc is equal to "3", it indicates that the first color-difference format is the 4:4:4 format.

Meanwhile, coded_data_bit_depth represents the pixel bit length of the encoded data.

Moreover, target_format_idc represents the second color-difference format, which is the color-difference format that is used when a decoded image obtained by decoding the encoded data is output. Furthermore, target_bit_depth represents the pixel bit length at the time of output. Moreover, max_value represents the maximum value of the color-difference component at the time of output. Furthermore, min_value represents the minimum value of the color-difference component at the time of output.

Moreover, progressive_flag is a flag that indicates whether or not the encoded data is a progressive signal. For example, when the value of progressive_flag is equal to "0", it indicates that the encoded data is not a progressive signal but an interlaced signal, which means that the color-difference conversion operation needs to be performed on a field-by-field basis.

Meanwhile, implicit_vertical_flag, interpolation_vertical_idc, tap_length_vertical_minus1, ver_filter_coeff, implicit_horizontal_flag, interpolation_horizontal_idc, tap_length_horizontal_minus1, and hor_filter_coeff represent the filter information.

Herein, implicit_vertical_flag is a flag that indicates the use of predefined filter information in the vertical direction. Moreover, interpolation_vertical_idc represents identification information that is used to identify the predefined filter information in the vertical direction. Furthermore, tap_length_vertical_minus1 represents the value smaller by one than the tap length of the filter coefficients in the vertical direction.

Moreover, ver_filter_coeff represents the filter coefficients in the vertical direction. Furthermore, implicit_horizontal_flag is a flag that indicates the use of predefined filter information in the horizontal direction. Moreover, interpolation_horizontal_idc represents identification information that is used to identify the predefined filter information in the horizontal direction. Furthermore, tap_length_horizontal_minus1 represents the value smaller by one than the tap length of the filter coefficients in the horizontal direction. Moreover, hor_filter_coeff represents the filter coefficients in the horizontal direction.

For example, it is assumed that the value of coded_format_idc is equal to "1". That is, it is assumed that the first color-difference format, which is the format of the encoded data, is the 4:2:0 format. Moreover, it is assumed that the value of target_format_idc is equal to or greater than "1". That is, it is assumed that the second color-difference format that is used when the decoded image is output is either the 4:2:2 format or the 4:4:4 format. In this case, it is necessary to perform up-sampling in the vertical direction. For that reason, in this case, the generating unit 16 generates the filter information in the vertical direction (i.e., generates the vertical up-sampling filter information) as the filter information.

Alternatively, it is assumed that the value of coded_format_idc is greater than "1". That is, it is assumed that the first color-difference format, which is the format of the encoded data, is either the 4:2:2 format or the 4:4:4 format. Moreover, it is assumed that the value of target_format_idc is equal to "1". That is, it is assumed that the second color-difference format that is used when the decoded image is output is the 4:2:0 format. In this case, the filter information points to the filter information in the vertical direction (the vertical down-sampling filter information).

Still alternatively, it is assumed that the value of coded_format_idc is equal to "1" or "2". That is, it is assumed that the first color-difference format is either the 4:2:0 format or the 4:2:2 format. Moreover, it is assumed that the value of target_format_idc is equal to "3". That is, it is assumed that the second color-difference format is the 4:4:4 format. In this case, the filter information points to the filter information in the horizontal direction (the horizontal up-sampling filter information).

Still alternatively, it is assumed that the value of coded_format_idc is equal to "3". That is, it is assumed that the first color-difference format is the 4:4:4 format. Moreover, it is assumed that the value of target_format_idc is equal to "1" or "2". That is, it is assumed that the second color-difference format is either the 4:2:0 format or the 4:2:2 format. In this case, the filter information points to the filter information in the horizontal direction (the horizontal down-sampling filter information).

Meanwhile, in FIG. 5, u(n) represents the non-negative binary representation of n bits. Herein, n is an integer equal to or greater than one. Moreover, se(v) represents a signed and zero-dimensional exponential-Golomb code.

In a memory (not illustrated) of the generating unit 16, the encoding device 10 stores in advance a definition table in which the predefined filter information in the vertical direction, the predefined filter information in the horizontal direction, and the identification information that is used to identify such filter information is stored in a corresponding manner.

FIG. 6 is a schematic diagram illustrating an exemplary data structure of definition information.

The definition information points to a table in which "value", "tap length", and "filter coefficients" are stored in a corresponding manner.

Herein, "value" points to the identification information of the filter information, and corresponds to the value indicated by interpolation_vertical_idc or interpolation_horizontal_idc.

Moreover, "tap length" represents the tap length of the filter coefficients corresponding to the value of "value" that is the identification information of the filter information. Furthermore, "filter coefficients" represents the filter coefficients corresponding to the value of "value" that is the identification information of the filter information.

Meanwhile, the color-difference conversion information may not contain the information obtained from the encoded data or the output information that has been standardized.

FIG. 7 is a diagram illustrating an exemplary syntax of the color-difference conversion information in the case when the color-difference conversion information does not contain the information obtained from the encoded data or the output information that has been standardized.

More particularly, the color-difference conversion information illustrated in FIG. 7 contains target_format_idc, progressive_flag, implicit_vertical_flag, tap_length_vertical_minus1, ver_filter_coeff, implicit_horizontal_flag, interpolation_horizontal_idc, tap_length_horizontal_minus1, and hor_filter_coeff.

Thus, in the example illustrated in FIG. 7, the color-difference conversion information does not contain the first color-difference format, which is the color-difference format of the encoded data, and the pixel bit length. Moreover, in the example illustrated FIG. 7, the color-difference conversion information does not contain the pixel bit length at the time of output as well as does not contain the maximum value and the minimum value of the color-difference component at the time of output.

As described above, as long as the color-difference conversion information contains the first color-difference format that indicates the resolution of the color-difference component of the encoded data, and contains the filter information of the filter to be used in converting the color-difference format of a decoded image that is obtained by decoding the encoded data; it serves the purpose.

FIG. 8 is a schematic diagram illustrating an exemplary syntax of the color-difference conversion information. In FIG. 8 is illustrated an example in which the color-difference conversion information contains the first color-difference format, the pixel sample position of the color-difference component of the encoded data, and the filter information.

In the example illustrated in FIG. 8, the color-difference conversion information contains chroma_loc_info_present_flag, chroma_sample_loc_type_top_field, chroma_sample_loc_type_bottom_field, chroma_filter_info_present_flag, and chroma_filter_info.

Herein, chroma_loc_info_present_flag is a flag that indicates whether or not the pixel position of a color-difference signal is present and indicates whether or not the filter information related to color-difference conversion is present. For example, when the value of chroma_loc_info_present_flag is equal to "1", it indicates that the pixel position of a color-difference signal is present as well as the filter information related to color-difference conversion is present. In contrast, when the value of chroma_loc_info_present_flag is equal to "0", it indicates that neither the pixel position of a color-difference signal is present nor the filter information related to color-difference conversion is present.

Moreover, chroma_sample_loc_type_top_field indicates the pixel sample position of the color-difference component of the top field (i.e., the pixel position of the target for sampling) when the encoded data is obtained by encoding with the use of interlaced scanning. Regarding the pixel sample position of the color-difference component of the top field, in all there are six known combinations by taking into consideration the combinations with the pixel sample position of the luminescence component.

Furthermore, chroma_sample_loc_type_bottom_field indicates the pixel sample position of the color-difference component of the bottom field (i.e., the pixel position of the target for sampling) when the encoded data is obtained by encoding with the use of interlaced scanning. In an identical manner to the case of the top field, regarding the pixel sample position of the color-difference component of the top field, in all there are six known combinations by taking into consideration the combinations with the pixel sample position of the luminescence component.

Moreover, chroma_filter_info_present_flag is a flag that indicates whether or not the filter information related to color-difference conversion is present. When the value of chroma_filter_info_present_flag is equal to "1" it indicates that the filter information related to color-difference conversion is present. In contrast, when the value of chroma_filter_info_present_flag is equal to "0", it indicates that the filter information related to color-difference conversion does not exist.

Furthermore, chroma_filter_info is the identification information of color-difference conversion filter information. The color-difference conversion filter information that corresponds to the identification information of color-difference conversion filter information is set in advance in color-difference conversion filter definition information.

FIG. 9 is a schematic diagram illustrating an exemplary data structure of the color-difference conversion filter definition information. Herein, the color-difference conversion filter definition information points to a table in which the identification information of color-difference conversion filter information (in FIG. 9, corresponding to "value") and the color-difference conversion filter information identified by the identification information is stored in a corresponding manner.

Besides, in the example illustrated in FIG. 9, the color-difference conversion filter definition information contains "tap length", "filter coefficients", "divisor", "phase shift", and "purpose".

Herein, "tap length" represents the tap length of the filter coefficients. Moreover, "filter coefficients" represents the filter coefficients. Furthermore, "divisor" represents the value of the denominator used when division is performed during filter processing. Moreover, "phase shift" represents the phase information of the filter. Furthermore, "purpose" represents the type of filter. More particularly, "purpose" represents the down-sampling filter or the up-sampling filter while performing color-difference format conversion.

FIG. 10 is a schematic diagram of another example of the data structure of the color-difference conversion filter definition information. In an identical manner to FIG. 9, the color-difference conversion filter definition information illustrated in FIG. 10 points to a table in which the identification information of color-difference conversion filter information (in FIG. 10, corresponding to "value") and the color-difference conversion filter information identified by the identification information is stored in a corresponding manner.

In the example illustrated in FIG. 10, the color-difference conversion filter definition information contains "tap length", "filter coefficients", "divisor", "phase shift", and "purpose".

In the color-difference conversion filter definition information illustrated in FIG. 10, when "value" serving as the identification information is a filter value, it indicates that the color-difference conversion filter information is generated according a predetermined syntax.

FIG. 11 is a diagram illustrating an exemplary syntax of the color-difference conversion filter information. For example, when "value" representing the identification information in the color-difference conversion filter definition information illustrated in FIG. 10 is equal to "1", the color-difference conversion filter information of the syntax illustrated in FIG. 11 is associated in advance.

In this case, when "value" representing the identification information in the color-difference conversion filter definition information illustrated in FIG. 10 is equal to "1", the generating unit generates the color-difference conversion filter information according to the color-difference conversion filter information having the syntax illustrated in FIG. 11.

The color-difference conversion filter information illustrated in FIG. 11 contains target_format_idc, num_of_filter_minus1, tap_length_minus1, and filter_coeff.

Herein, target_format_idc is identical to the earlier description. Moreover, num_of_filter_minus1 represents the value smaller by one than the color-difference conversion filter count. Furthermore, tap_length_minus1 represents the value smaller by one than the tap length of the filter coefficients. Moreover, filter_coeff represents the filter coefficients.

FIG. 12 is a diagram illustrating another example of the syntax of the color-difference conversion information. As compared to the color-difference conversion information illustrated in FIG. 8, the color-difference conversion information illustrated in FIG. 12 differs in the way that chroma_filter_info is not included.

In the example illustrated in FIG. 12, the color-difference conversion information contains chroma_loc_info_present_flag, chroma_sample_loc_type_top_field, chroma_sample_loc_type_bottom_field, and chroma_filter_info_present_flag.

Herein, chroma_filter_info_present_flag is a flag that indicates whether or not the filter information related to color-difference conversion is present separately. When the value of chroma_filter_info_present_flag is equal to "1", it indicates that the filter information related to color-difference conversion is present. In contrast, when the value of chroma_filter_info_present_flag is equal to "0", it indicates that the filter information related to color-difference conversion does not exist.

FIG. 13 is a diagram illustrating an example of the color-difference conversion filter information that is present when the value of chrome_filter_info_present_flag in the color-difference conversion information illustrated in FIG. 12 is equal to "1".

The color-difference conversion filter information illustrated in FIG. 13 contains num_of_filter_set_minus1, implict_filter_set_flag, filter_set_idc, num_of_filter_minus1, implicit_filter_flag, filter_idc, tap_length_minus1, and filter_coeff.

Herein, num_of_filter_set_minus1 represents the value smaller by one than the filter set count. Moreover, implicit_filter_set_flag is a flag indicating that the information of a predefined filter set is used. Furthermore, filter_set_idc represents identification information that is used to identify the information of the predefined filter set. Moreover, num_of_filter_minus1 represents the value smaller by one than the color-difference conversion filter count. Furthermore, implicit_filter_flag is a flag that indicates the use of predefined filter information. Moreover, filter_idc represents the identification information of the predefined filter information. Furthermore, tap_length_minus1 represents the value smaller by one than the tap length of the filter coefficients. Moreover, filter_coeff represents the filter coefficients.

FIG. 14 is a schematic diagram illustrating an exemplary data structure of the color-difference conversion filter definition information. The data structure illustrated in FIG. 14 is different than the example illustrated in FIG. 9. In the example illustrated in FIG. 14, the it color-difference conversion filter definition information points to a table in which "filter_set_idc", "filter_idc", "tap length", "finer coefficients", "divisor", "phase shift", and "purpose" are stored in a corresponding manner.

Herein, "filter_set_idc" represents the identification information that is used to identify the information of the filter set. The value of "filter_set_idc" corresponds to filter_set_idc illustrated in FIG. 13.

Moreover, "filter_idc" represents the identification information that is used to identify the filter information. The value of "filter_idc" corresponds to filter_idc illustrated in FIG. 13.

Furthermore, "tap length" represents the tap length of the filter coefficients as described above. Moreover, "filter coefficients" represents the filter coefficients. Furthermore, "divisor" represents the value of the denominator used when division is performed during filter processing. Moreover, "phase shift" represents the phase information of the filter. Furthermore, "purpose" represents the purpose of the filter, and indicates the down-sampling filter or the up-sampling filter while performing color-difference format conversion.

FIG. 15 is a diagram illustrating an example of the color-difference conversion filter information in the case when the value of chroma_filter_info_present_flag in the color-difference conversion filter definition information illustrated in FIG. 14 is equal to "1".

The color-difference conversion filter information illustrated in FIG. 15 contains target_format_idc, implicit_vertical_flag, vertical_filter_idc, tap_length_vertical_minus1, ver_filter_coeff, second_filter_flag, second_vertical_filter_idc, tap_length_second_vertical_minus1, second_ver_filter_coeff, implicit_horizontal_flag, horizontal_filter_idc, tap_length_horizontal_minus1, and hor_filter_coeff.

Herein, in an identical manner to FIG. 5, target_format_idc represents the second color-difference format. However, in the color-difference conversion filter information illustrated in FIG. 15, the meaning given to the value of target_format_idc is different than the meaning given with reference to FIG. 5. More particularly, in the example illustrated in FIG. 15, when the value of target_format_idc is set to "0", it indicates that the second color-difference format is a monochrome format having only the luminescence specified. In contrast, when the value of target_format_idc is set to "1", it indicates that the second color-difference format is the 4:2:0 format. Moreover, when the value of target_format_idc is set to "2", it indicates that the second color-difference format is the 4:2:2 format. Furthermore, when the value of target_format_idc is set to "3", it indicates that the second color-difference format is the 4:4:4 format.

Meanwhile, chroma_format_idc is included in the encoded data, and represents the first color-difference format.

Moreover, implicit_vertical_flag is a flag that indicates the use of predefined filter information in the vertical direction. Furthermore, vertical_filter_idc represents the identification information that is used to identify the predefined filter information in the vertical direction. Moreover, tap_length_vertical_minus1 represents the value smaller by one than the tap length of the filter coefficients in the vertical direction.

Furthermore, ver_filter_coeff represents the filter coefficient set in the vertical direction. Moreover, second_filter_flag is a flag defined regarding a field signal in the case when different filter sets in the vertical direction are used in the top field and the bottom field. If the value of second_filter_flag is set to "1", then it is possible to define a second vertical filter.

Furthermore, second_vertical_filter_idc represents the identification information that is used to identify the second set of predefined filter information in the vertical direction. Moreover, tap_length_second_vertical_minus1 represents the value smaller by one than the tap length of the second filter coefficient set in the vertical direction. Furthermore, second_ver_filter_coeff represents the second filter coefficient set in the vertical direction.

Furthermore, implicit_horizontal_flag is a flag that indicates the use of predefined filter information in the horizontal direction.

Moreover, horizontal_filter_idc represents the identification information that is used to identify the predefined filter information in the horizontal direction. Furthermore, tap_length_horizontal_minus1 represents the value smaller by one than the tap length of the filter coefficients in the horizontal direction. Moreover, hor_filter_coeff represents the filter coefficients in the horizontal direction.

For example, it is assumed that the value of chroma_format_idc is equal to "1". That is, it is assumed that the first color-difference format, which is the format of the encoded data, is the 4:2:0 format. Moreover, it is assumed that the value of target_format_idc is equal to or greater than "1".

That is, it is assumed that the second color-difference format that is used when the decoded image is output is either the 4:2:2 format or the 4:4:4 format. In that case, it is necessary to perform up-sampling in the vertical direction. For that reason, in this case, the generating unit 16 generates the filter information in the vertical direction generates the vertical up-sampling filter information) as the filter information.

Alternatively, it is assumed that the value of coded_format_idc is greater than "1". That is, it is assumed that the first color-difference format, which is the format of the encoded data, is either the 4:2:2 format or the 4:4:4 format. Moreover, it is assumed that the value of target_format_idc is equal to "1", That is, it is assumed that the second color-difference format that is used when the decoded image is output is the 4:2:0 format. In this case, the filter information points to the filter information in the vertical direction (the vertical down-sampling filter information).

Still alternatively, it is assumed that the value of chroma_formal_idc is equal to "1" or "2". That is, it is assumed that the first color-difference format is either the 4:2:0 format or the 4:2:2 format. Moreover, it is assumed that the value of target_format_idc is equal to "3". That is, it is assumed that the second color-difference format is the 4:4:4 format. In this case, the filter information points to the filter information in the horizontal direction (the horizontal up-sampling filter information).

Still alternatively, it is assumed that the value of chroma_format_idc is equal to "3". That is, it is assumed that the first color-difference format is the 4:4:4 format. Moreover, it is assumed that the value of target_format_idc is equal to "1" or "2". That is, it is assumed that the second color-difference format is either the 4:2:0 format or the 4:2:2 format. In this case, the filter information points to the filter information in the horizontal direction (the horizontal down-sampling filter information).

FIG. 16 is a schematic diagram illustrating an exemplary data structure of the color-difference conversion filter definition information. The data structure illustrated in FIG. 16 is different than the example illustrated in FIG. 14.

In the example illustrated in FIG. 16, the color-difference conversion filter definition information points to a table in which "filter_idc" "tap length", "filter coefficients", "divisor", "phase shift", and "purpose" are stored in a corresponding manner.

Herein, "filter_idc" represents the identification information that is used to identify the information of the filter set information. The value of "filter_idc" corresponds to vertical_filter_idc, second_filter_idc, and horizontal_filter_idc specified in the color-difference conversion information illustrated in FIG. 15.

Moreover, "tap length" represents the tap length of the filter coefficients. Furthermore, "filter coefficients" represents the filter coefficients. Moreover, "divisor" represents the value of the denominator used when division is performed during filter processing. Furthermore, "phase shift" represents the phase information of the filter. Moreover, "purpose" represents the purpose of the filter, and indicates a down-sampling filter or an up-sampling filter while performing color-difference format conversion.

FIG. 17 is a diagram illustrating an example of the color-difference conversion filter information in the case when the value of chroma_filter_info_present_flag, which is specified in the color-difference conversion information illustrated in FIG. 8 or FIG. 12, is equal to "1".

The color-difference conversion filter information illustrated in FIG. 17 contains target_format_idc, tap_length_vertical_minus1, ver_filter_coeff, second_filter_flag, tap_ length_second_vertical_minus1, second_ver_filter_coeff, implicit_horizontal_flag, horizontal_filter_idc, tap_length_horizontal_minus1, and hor_filter_coeff. As compared to the color-difference conversion filter information illustrated in FIG. 15, the color-difference conversion filter information illustrated in FIG. 17 differs in the way, that all filter information is defined in an explicit fashion.

Returning to the explanation with reference to FIG. 1, the generating unit outputs the color-difference conversion information that has been generated to the NAL unit generating unit 18.

The NAL unit generating unit 18 receives the encoded data from the encoding unit 14. Moreover, the NAL unit generating unit 18 receives the color-difference conversion information from the generating unit 16.

Then, the NAL unit generating unit 18 generates NAL unit information (where NAL stands for Network Abstraction Layer) that contains the encoded data received from the encoding unit 14, contains the color-difference conversion information received from the generating unit 16, and contains byte alignment information which is header information and adjustment information at the time of performing reading and writing. Then, the NAL unit generating unit 18 outputs the NAL unit information to the transmission information generating unit 20.

Herein, the NAL unit information is information corresponding to a high-level syntax included in the transmission information (described later) that is output by the encoding device 10. In the structure (syntax) of the transmission information, the high-level syntax is located at an upper level than the slice syntax, and contains parameters that affect the entire frame of the transmission information. As described above, the NAL unit information contains the encoded data, contains the color-difference conversion information received from the generating unit 16, and contains byte alignment information which is header information and adjustment information at the time of performing reading and writing.

The transmission information generating unit 20 receives the NAL unit information from the NAL unit generating unit 18. Then, the transmission information generating unit 20 converts the NAL unit information into the information of a system of the MPEG-2 system or the ISO file format, and generates transmission information. Then, the transmission information generating unit 20 outputs the transmission information.

Given below is the explanation of an encoding operation performed in the encoding device 10.

Figure 18:
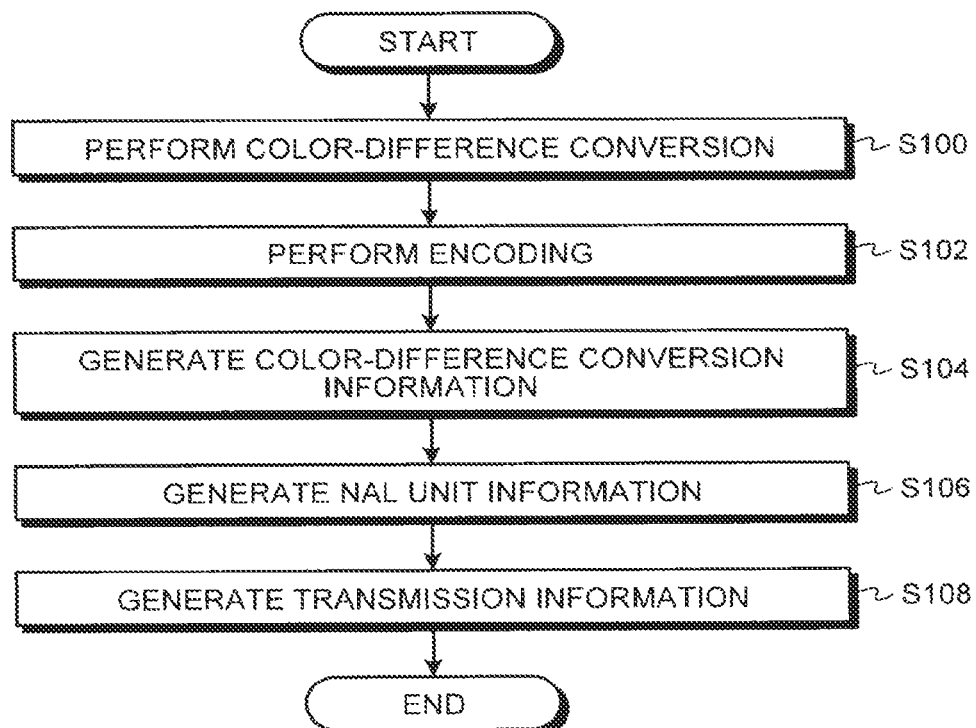
FIG. 18 is a flowchart of an encoding operation according to the first embodiment.

FIG. 18 is a flowchart of the encoding operation performed in the encoding device 10.

Firstly, the converting unit 12 performs a color-difference converting operation for converting the resolution of the color-difference component of the original image received by the encoding device 10 (Step S100). Then, to the encoding unit 14, the converting unit 12 outputs the original image having the converted resolution of the color-difference component as a color-difference conversion image. Moreover, the converting unit 12 outputs the color-difference signal information to the generating unit 16.

Then, the encoding unit 14 encodes the color-difference conversion image received from the converting unit 12, and generates encoded data (Step S102). Subsequently, the encoding unit 14 outputs the encoded data to the NAL unit generating unit 18. Moreover, the encoding unit 14 outputs a reference image, which has the same color-difference form, the 4:2:0 format) as the format of the color-difference conversion image, to the generating unit 16.

Then, the generating unit 16 generates color-difference conversion information by referring to the color-difference signal information received from the converting unit 12 and by referring to the reference image that has the color-difference format of the color-difference conversion image and that is received from the encoding unit 14 (Step S104). Subsequently, the generating unit 16 outputs the color-difference conversion information to the NAL unit generating unit 18.

Then, the NAL unit generating unit 18 generates NAL unit information that contains the encoded data received from the encoding unit 14, contains the color-difference conversion information received from the generating unit 16, and contains byte alignment information which is header information and adjustment information at the time of performing reading and writing (Step S106). Then, the NAL unit generating unit 18 outputs the NAL unit information to the transmission information generating unit 20.

Subsequently, the transmission information generating unit 20 converts the NAL unit information into the information of a system layer, and generates transmission information (Step S108). Then, the transmission information generating unit 20 outputs the transmission information.

As described above, in the encoding device 10 according to the first embodiment, the encoding unit 14 encodes a color-difference conversion image and generates encoded data. Then, the generating unit 16 generates color-difference conversion information that contains a first color-difference format indicating the resolution of the color-difference component of the encoded data; a second color-difference format indicating the resolution of the color-difference component that is used when a decoded image which is obtained by decoding the encoded data is output; and filter information that is used to identify a filter that is used in converting the decoded image of the encoded data having the first color-difference format into a decoded image having the second color-difference format.

For that reason, when outputting the decoded image that is obtained by decoding the encoded data encoded by the encoding device 10, the decoded image of the encoded data having the first color-difference format is converted into an image having the second color-difference format using a filter that is identified by the filter information which is included in the color-difference conversion information. As a result, it becomes possible to suppress the image deterioration occurring due to resolution conversion.

Thus, in the encoding device 10 according to the first embodiment, it becomes possible to suppress the image deterioration.

First Modification

In the first embodiment, the explanation is given for a case in which the filter information points to filter information that is used in converting a decoded image having the first color-difference format into a decoded image having the second color-difference format.

However, as long as the filter information is information that is used to identify the filter used in converting a decoded image having the first color-difference format into a decoded image having the second color-difference format, it serves the purpose. For example, the specific information can be identification information that is used to identify the filter information used in converting a decoded image having the first color-difference format into a decoded image having the second color-difference format.

In that case, the abovementioned definition information, in which filter information is held in a corresponding manner to identification information of the filter information, may be stored in advance in the encoding device 10 as well as in a decoding device that decodes the encoded data (i.e., in a decoding device described later). Then, in the decoding device that decodes the encoded data, the decoded image obtained by decoding the encoded data can be subjected to filter processing using the filter information identified by the identification information included in the filter information. With that, the color-difference format of the decoded image can be converted.

Meanwhile, the filter information may also be filter information that is used in filter processing performed by the converting unit 12.

In that case, in a decoding device that decodes the encoded data, a filter that is used in converting the decoded image having the first color-difference format into a decoded image having the second color-difference format is set by referring to the filter information included in the filter information. Then, the decoding device can convert the color-difference format of the decoded image using the filter that has been set.

Second Embodiment

In a second embodiment, the explanation is given about generating the color-difference conversion information by implementing a different method than the method implemented in the first embodiment.

Figure 19:
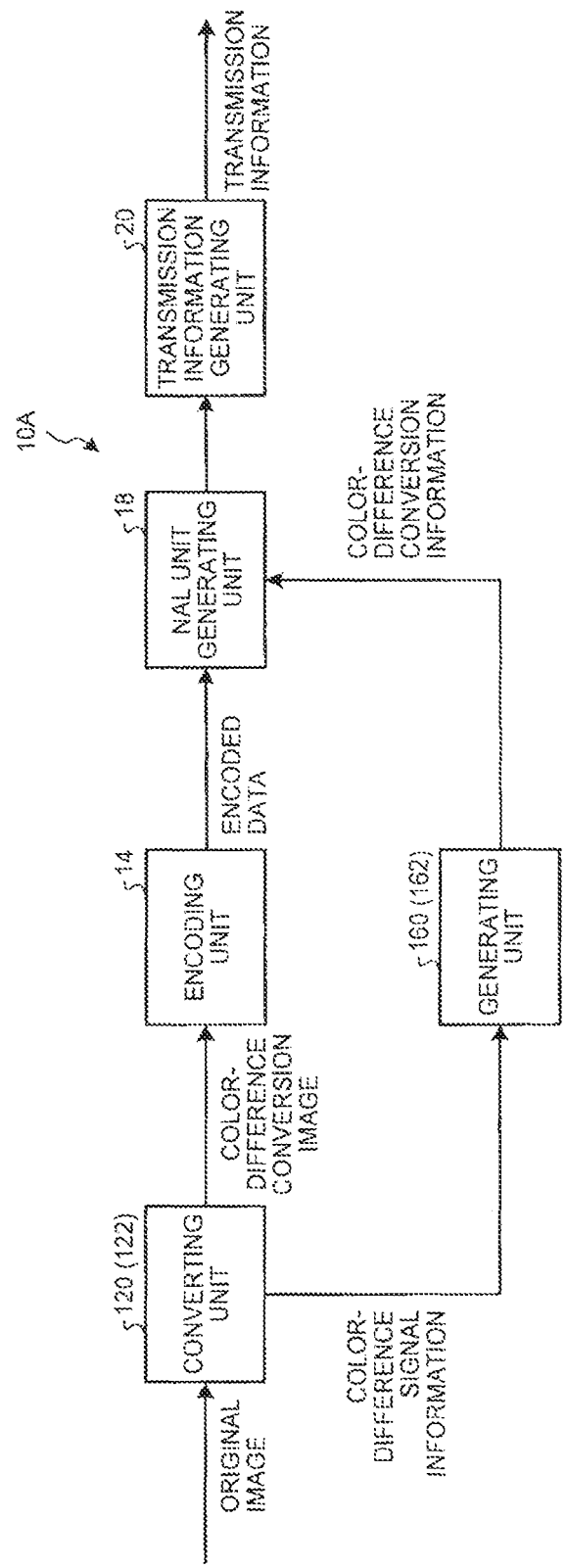
FIG. 19 is a schematic diagram illustrating an encoding device according to a second embodiment.

FIG. 19 is a schematic diagram illustrating an encoding device 10A according to the second embodiment.

The encoding device 10A includes a converting unit 120, the encoding unit 14, a generating unit 160, the NAL unit generating unit 18, and the transmission information generating unit 20.

Thus, in the encoding device 10A; the converting unit 12 is replaced with the converting unit 120, and the generating unit 16 is replaced with the generating unit 160. Apart from that, the configuration of the encoding device 10A is identical to the configuration of the encoding device 10 according to the first embodiment.

As far as the converting unit 120 is concerned, apart from the point that filter information used by the converting unit 120 is output as color-difference signal information to the generating unit 160, the configuration of the converting unit 120 is identical to the configuration of the converting unit 12. More particularly, to the generating unit 160, the converting unit 120 outputs the color-difference signal information that contains the filter information used in filter processing performed by the converting unit 12A and the filter information used in filter processing performed by the converting unit 12B. Meanwhile, in the second embodiment, in an identical manner to the first embodiment, the filter information used in filter processing performed by the converting unit 12A is horizontal down-sampling filter information; while the filter information used in filter processing performed by the converting unit 12B is vertical down-sampling filter information.

The generating unit 160 receives the color-difference signal information from the converting unit 120. Then, the generating unit 160 generates the color-difference conversion information by referring to the color-difference signal information.

Figure 20:
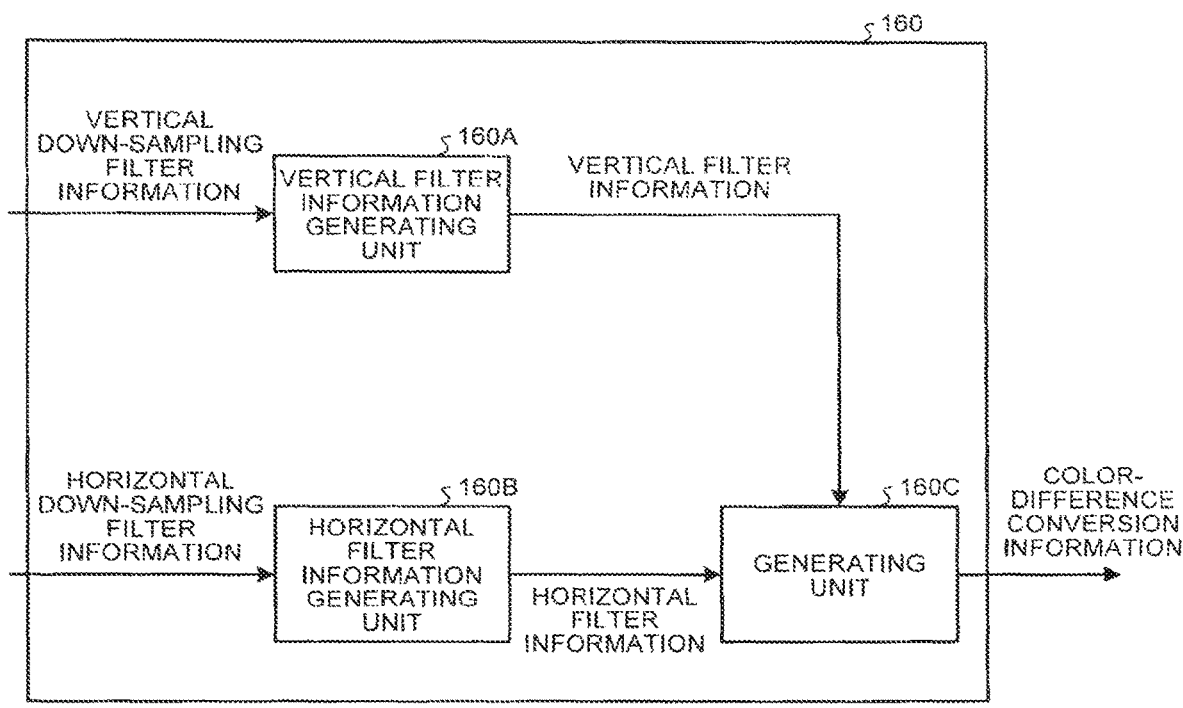
FIG. 20 is a schematic diagram illustrating a generating unit in the encoding device according to the second embodiment.

FIG. 20 is a schematic diagram illustrating the generating unit 160.

The generating unit 160 includes a vertical filter information generating unit 160A, a horizontal filter information generating unit 160B, and a generating unit 160C.

The vertical filter information generating unit 160A receives, from the color-difference signal information, the filter information that is used in filter processing performed by the converting unit 12B (i.e., the vertical down-sampling filter information).

Then, the vertical filter information generating unit 160A refers to the vertical down-sampling filter information used in filter processing performed by the converting unit 12B, and designs filter information that is used in converting an image having the 4:2:0 format into an image having the 4:2:2 format. That is, the vertical filter information generating unit 160A performs vertical up-sampling with respect to a decoded image having the 4:2:0 format, and designs filter information to be used in obtaining an image having the 4:2:2 format. Herein, while designing the filter information, Equation (4) given below is used. Subsequently, the vertical filter information generating unit 160A outputs vertical filter information, which is the filter information that has been designed, to the generating unit 160C.

The horizontal filter information generating unit 160B refers to the filter information (horizontal down-sampling filter information), which is used in filter processing performed by the converting unit 12A, in the color-difference signal information; and designs filter information that is used in converting the image having the 4:2:2 format into the original image having the 4:4:4 format. That is, the horizontal filter information generating unit 160B performs horizontal up-sampling with respect to the image having the 4:2:2 format, and designs filter information to be used in obtaining the original image having the 4:4:4 format. Then, the horizontal filter information generating unit 160B outputs horizontal filter information, which is the filter information that has been designed, to the generating unit 160C.

$$D = (d_1 d_2 +z, 999 \ d_{2n}) \quad (4)$$

$$U = (u_1 u_2 + z, 999 \ u_n), \ V = (v_1 v_2 + z, 999 \ v_n)$$

$$X = \begin{pmatrix} u_1 & u_2 & +z, 999 & u_n & & & \\ v_1 & v_2 & +z, 999 & v_n & & & \\ & & u_1 & u_2 & +z, 999 & u_n & \\ & & v_1 & v_2 & +z, 999 & v_n & \\ & & & & +z, 999 & & \\ & & & & +z, 999 & & \\ & & & & & u_1 & u_2 & u_n \\ +z, 999 & +z, 999 & +z, 999 & & & v_{2n-1} & v & v \end{pmatrix} 2n$$

$$I = \left( +z, \underset{n-1}{999} \ 01 + z, \underset{n-1}{999} \ 0 \right)$$

$$DX = I$$

Herein, Equation (4) is a filter calculation formula that is used by the vertical filter information generating unit 160A and the horizontal filter information generating unit 160B while designing filters.

More particularly, Equation (4) is a formula that enables designing of filter information in such a way that a one-dimensional image has the same image quality as an image that is obtained by first up-sampling to double the color-difference component of each pixel constituting the one-dimensional image and then down-sampling to halve the color-difference component of each pixel.

In Equation (4), F) represents a vector of down-sampling filter coefficients, and $d_1$ to $d_{2n}$ (where n is an integer equal to or greater than one) represent the filter coefficients of the down-sampling filter. Moreover, U and V represent vectors of up-sampling filter coefficients; $u_1$ to $u_n$ (where n is an integer equal to or greater than one) represent the filter coefficients used in top field up-sampling; and $v_1$ to $v_n$ (where is an integer equal to or greater than one) represent the filter coefficients used in bottom field up-sampling.

Furthermore, in Equation (4), X represents a matrix of 2n rows and (2n−1) columns and has the up-sampling filter coefficients as the elements. Moreover, I represents a vector in which the element count is 2n−1; in which the n-th element is 1; and in which the remainder is 0.

In order to design the filter information; D, U, and V are designed in such a way that DX=I is satisfied.

With the use of Equation (4), from the down-sampling filter coefficients, the corresponding up-sampling filter coefficients can be obtained. Conversely, from the up-sampling filter coefficients, the corresponding down-sampling filter coefficients can also be obtained.

The generating unit 160C generates color-difference conversion information. More specifically, the generating unit 160C uses the color-difference format of the reference image (i.e., the 4:2:0 format), which is received from the encoding unit 14, as the first color-difference format of the encoded data obtained by encoding performed by the encoding unit 14. Moreover, the generating unit 160O reads the second color-difference format from a memory (not illustrated). Furthermore, as the filter information, the generating unit 160C makes use of the vertical finer information received from the vertical filter information generating unit 160A and the horizontal filter information received from the horizontal filter information generating unit 160B. Then, the generating unit 160 generates the color-difference conversion information that contains the first color-difference format, the second color-difference format, and the filter information; and outputs the color-difference conversion information to the NAL unit generating unit 18.

As described above, in the encoding device 10A according to the second embodiment, the generating unit 160 receives the filter information, which is used in the converting unit 120, as the color-difference signal information. Then, the generating unit 160 generates the color-difference conversion information by referring to the color-difference signal information.

Hence, when outputting a decoded image that is obtained by decoding the encoded data encoded by the encoding device 10A, the decoded image of the encoded data having the first color-difference format is converted into a decoded image having the second color-difference format using the filter information that is identified by the filter information included in the color-difference conversion information. As a result, it becomes possible to suppress the image deterioration occurring due to resolution conversion.

Thus, even in the case when the color-difference conversion information is generated by implementing a different method than the method implemented in the first embodiment, it is possible to achieve the same effect as the effect achieved in the first embodiment.

Besides, in addition to the effect achieved in the encoding device 10 according to the first embodiment, it also becomes possible to simplify the configuration of the generating unit 160 (the generating unit 16).

Second Modification

Meanwhile, in the first embodiment, the explanation is given for a case in which the converting unit 12 includes two converting units (namely, the converting units 12A and 12B), and the resolution of the color-difference component is converted more than once. However, alternatively, the converting unit 12 can be a functional unit that converts the color difference only once. Moreover, in the first embodiment, the explanation is given for a case in which the converting unit 12 performs filter processing to reduce the resolution of the color-difference component (i.e., to perform down-sampling). However, alternatively, the converting unit 12 can be configured to perform filter processing to increase the resolution of the color-difference component (i.e., to perform up-sampling).

In this case, as illustrated in FIG. 19, the encoding device 10A includes a converting unit 122 in place of the converting unit 120, and includes a generating unit 162 in place of the generating unit 160.

Figure 21:
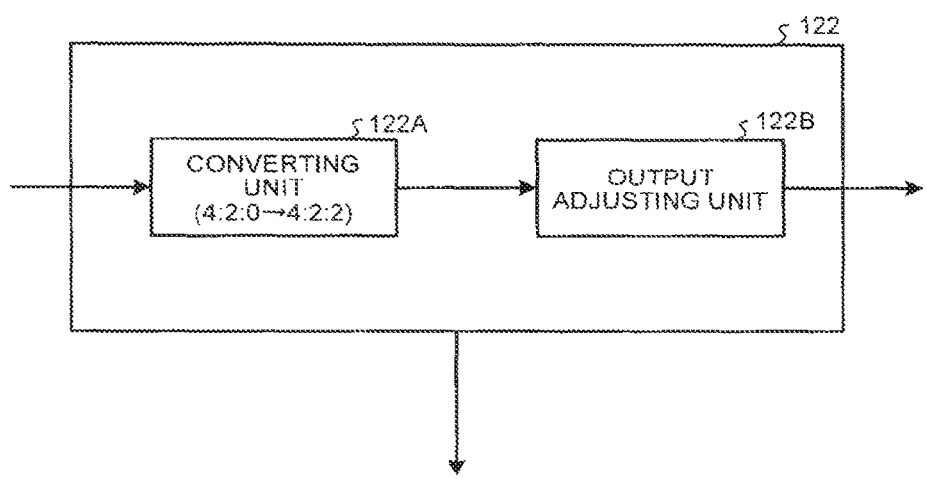
FIG. 21 is a schematic diagram illustrating a converting unit according to a second modification.

FIG. 21 is a schematic diagram illustrating the converting unit 122. Herein, the converting unit 122 includes a converting unit 122A and an output adjusting unit 122B.

For example, the converting unit 122 receives an original image having the 4:2:0 format. Then, the converting unit 122A converts the original image having the 4:2:0 format into an image having the 4:2:2 format. Herein, with respect to the color-difference component of each pixel constituting the original image having the 4:2:0 format, the converting unit 122A performs filter processing using filter information regarding pixel interpolation in the vertical direction. With that, the converting unit 122A performs up-sampling in which the color-difference component of each pixel constituting the original image having the 4:2:0 format is interpolated in the vertical direction. That is, the converting unit 122A converts the original image having the 4:2:0 format into an image having the 4:2:2 format. Then, the converting unit 122A outputs the post-conversion image having the 4:2:2 format to the output adjusting unit 122B.

The output adjusting unit 122B performs a clipping operation so as to ensure that the value of each pixel constituting the received image, which has the 4:2:2 format and which is received from the converting unit 122A, falls in a range between the smallest value and the largest value set according to a standard. Then, to the encoding unit 14, the output adjusting unit 122B outputs the post-clipping image as a color-difference conversion image that has been subjected to color-difference conversion in the converting unit 122.

Moreover, the output adjusting unit 122B outputs the color-difference signal information, which contains the filter information used in filter processing performed by the converting unit 122A, to the generating unit 162.

Given below is the explanation about the generating unit 162.

Figure 22:
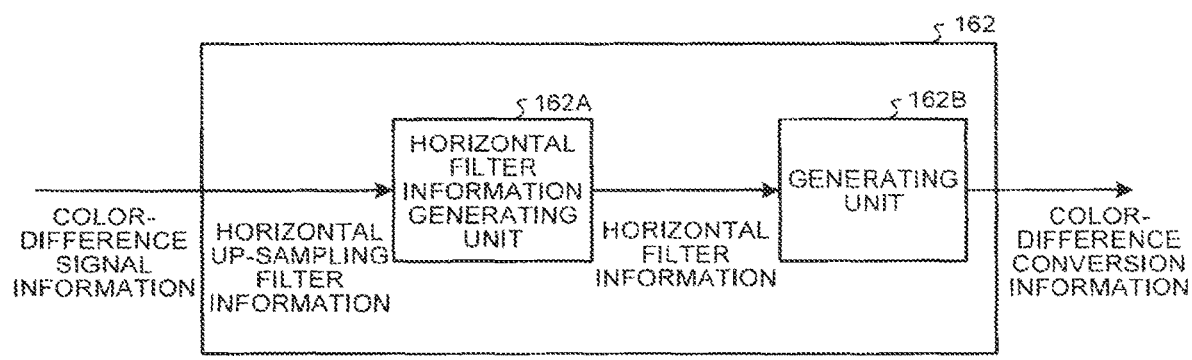
FIG. 22 is a schematic diagram illustrating a generating unit according to the second modification.

FIG. 22 is a schematic diagram illustrating the generating unit 162.

The generating unit 162 includes a horizontal filter information generating unit 162A and a generating unit 162B.

The horizontal filter information generating unit 162A receives, as the color-difference signal information, the filter information used in filter processing performed by the converting unit 122A (i.e., receives the horizontal down-sampling filter information).

Then, from the horizontal down-sampling filter information used in filter processing performed by the converting unit 122A, the horizontal filter information generating unit 162A designs filter information to be used in converting an image having the 4:2:2 format into an image having the 4:2:0 format. That is, the horizontal filter information generating unit 162A performs horizontal down-sampling with respect to an image having the 4:2:2 format, and designs the filter information to be used in obtaining an image having the 4:2:0 format. Then, the horizontal filter information generating unit 162A outputs horizontal filter information, which is the filter information that has been designed, to the generating unit 162B.

The generating unit 162B generates color-difference conversion information. More specifically, the generating unit 162B uses the color-difference format of the reference image (i.e., the 4:2:2 format), which is received by the encoding unit 14, as the first color-difference format of the encoded data encoded by the encoding unit 14. Moreover, the generating unit 162B reads the second color-difference format from a memory (not illustrated). Furthermore, as the filter information, the generating unit 162B makes use of the horizontal filter information received from the horizontal filter information generating unit 162A.

Then, the generating unit 162B generates the color-difference conversion information that contains the first color-difference format, the second color-difference format, and the filter information. Subsequently, the generating unit 162B outputs the color-difference conversion information to the NAL unit generating unit 18.

In this way, even in the case when the converting unit 122 performs filter processing to increase the resolution of the color-difference component (i.e., performs up-sampling), the generating unit 162 generates the color-difference conversion information that contains the first color-difference format, the second color-difference format, and the filter information.

Hence, in the second modification, it becomes possible to achieve the same effect as the effect achieved in the first embodiment.

Third Modification

In the embodiments described above, the explanation is given for a case in which color-difference conversion is performed in the encoding device 10 or the encoding device 10A. However, alternatively, the configuration may be such that the converting unit 12 (the converting unit 120 or the converting unit 122) that performs color-difference conversion is not disposed.

Figure 23:
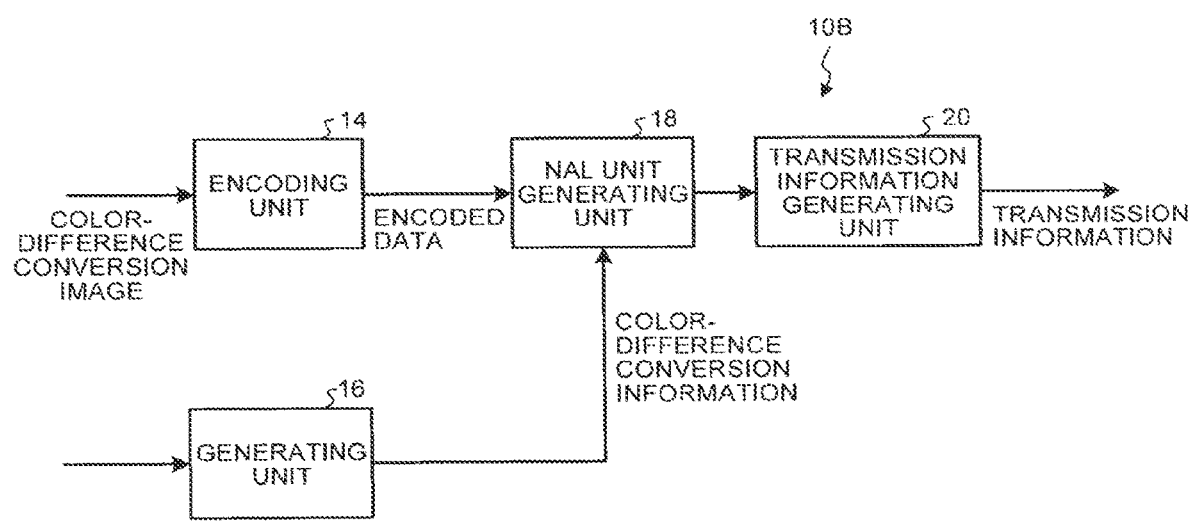
FIG. 23 is a schematic diagram illustrating an encoding device according to a third modification.

FIG. 23 is a schematic diagram illustrating a functional configuration of an encoding device 10B.

The encoding device 10B includes the encoding unit 14, the NAL, unit generating unit 18, the transmission information generating unit 20, and the generating unit 16.

Apart from the fact that the converting unit 12 is not disposed, the encoding device 10B has the same configuration as the configuration of the encoding device 10 according to the first embodiment. In this embodiment, the encoding unit 14 of the encoding device 10B receives the color-difference conversion information from an external device. Moreover, the generating unit 16 receives the color-difference conversion information from an external device.

In this way, the encoding device 10B can be configured to not include the converting unit 12.

Third Embodiment

In a third embodiment, the explanation is given about a decoding device that decodes the encoded data included in tale transmission information which is generated by any one of the encoding devices 10, 10A, and 10B.

Figure 24:
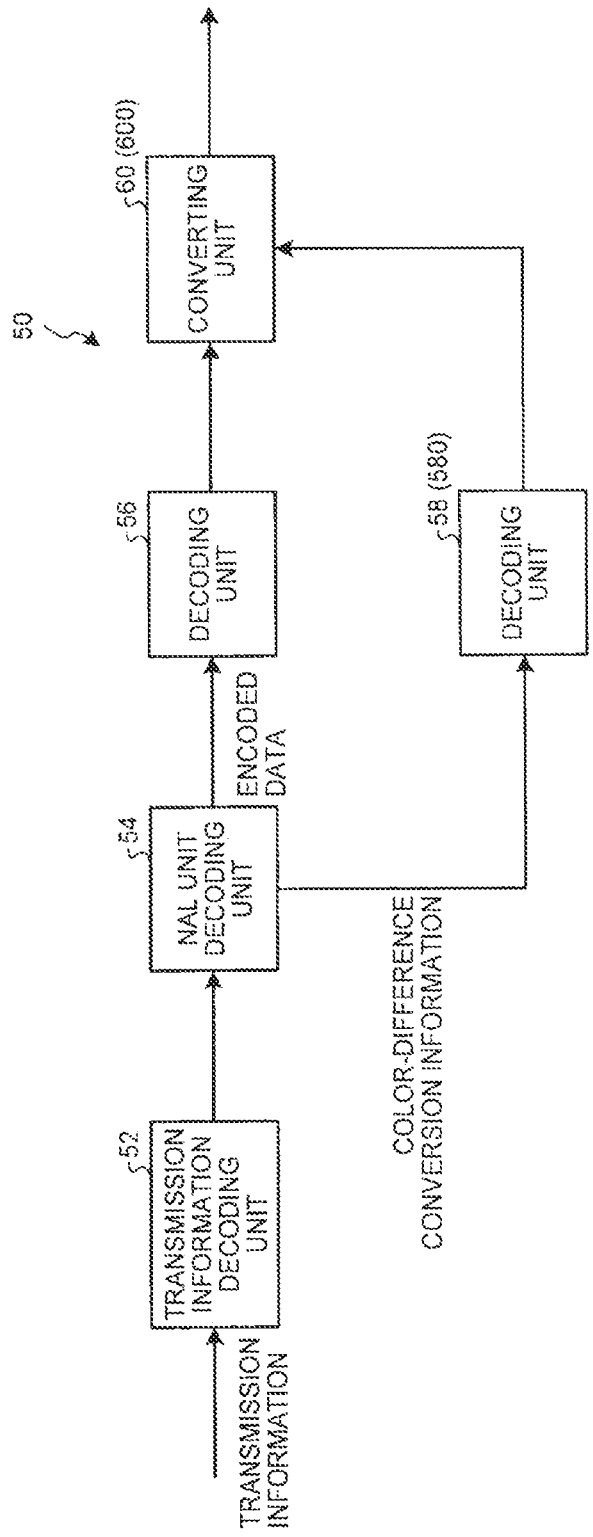
FIG. 24 is a schematic diagram illustrating a decoding device according to a third embodiment.

FIG. 24 is a schematic diagram illustrating a decoding device according to the third embodiment. Herein, a decoding device 50 according to the third embodiment includes a transmission information decoding unit 52, a NAL unit decoding unit 54, a decoding unit 56, a decoding unit 58, and a converting unit 60.

The transmission information decoding unit 52 acquire transmission information. In the third embodiment, the explanation is given for an example in which the transmission information decoding unit 52 acquires transmission information from the encoding device 10 according to the first embodiment. Moreover, in the third embodiment, the explanation is given for an example in which the transmission information received from the encoding device 10 contains the color-difference conversion information illustrated in FIG. 5. Then, the transmission information decoding unit 52 generates NAL unit information from the transmission information that is acquired.

The NAL unit decoding unit 54 receives the NAL unit information from the transmission information decoding unit 52, and decodes the NAL unit information. As a result, the NAL unit decoding unit 54 obtains the encoded data, the color-difference conversion information, and the byte alignment information.

Then, the NAL unit decoding unit 54 outputs the encoded data, which is obtained from the NAL unit information, to the decoding unit 56. Moreover, the NAL unit decoding unit 54 outputs the color-difference conversion information, which is obtained from the NAL unit information, to the decoding unit 58.

The decoding unit 58 decodes the color-difference conversion information; and obtains the first color-difference format, the second-color difference format, and the filter information. Then, the decoding unit 58 outputs the obtained information to the converting unit 60.

Figure 25:
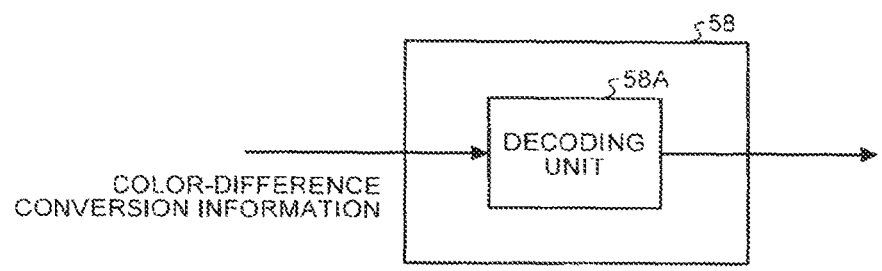
FIG. 25 is a schematic diagram illustrating a decoding unit in the decoding device according to the third embodiment.

FIG. 25 is a schematic diagram illustrating a functional configuration of the decoding unit 58.

As illustrated in FIG. 25, the decoding unit 58 includes a decoding unit 58A that analyzes the color-difference conversion information and reads the first color-difference format, the second color-difference format, and the filter information from the color-difference conversion information. Then, to the converting unit 60, the decoding unit 58A outputs the color-difference conversion information that contains the first color-difference format, the second color-difference format, and the filter information.

Meanwhile, if the filter information included in the color-difference conversion information points to the filter information to be used in converting a decoded image having the first color-difference format into a decoded image having the second color-difference format, then the decoding unit 58A outputs the filter information without modification to the converting unit 60.

In contrast, if the filter information included in the color-difference conversion information points to the identification information that is used to identify the filter information to be used in converting a decoded image having the first color-difference format into a decoded image having the second color-difference format, then the decoding unit 58A reads the filter information identified by the identification information from definition information that is stored in advance in a memory (not illustrated). Then, as the filter information, the decoding unit 58A outputs the read filter information to the converting unit 60.

Alternatively, if the filter information included in the color-difference conversion information points to the filter information that is used in filter processing performed by the converting unit 12 of the encoding device 10; then the decoding unit 58A designs, from that filter information, filter information to be used in converting a decoded image having the first color-difference format into a decoded image having the second color-difference format. Then, as the filter information, the decoding unit 58A outputs the designed filter information to the converting unit 60.

Returning to the explanation with reference to FIG. 24, the decoding unit 56 decodes the encoded data and obtains a decoded image. Then, the decoding unit 56 outputs the decoded image to the converting unit 60.

Figure 26:
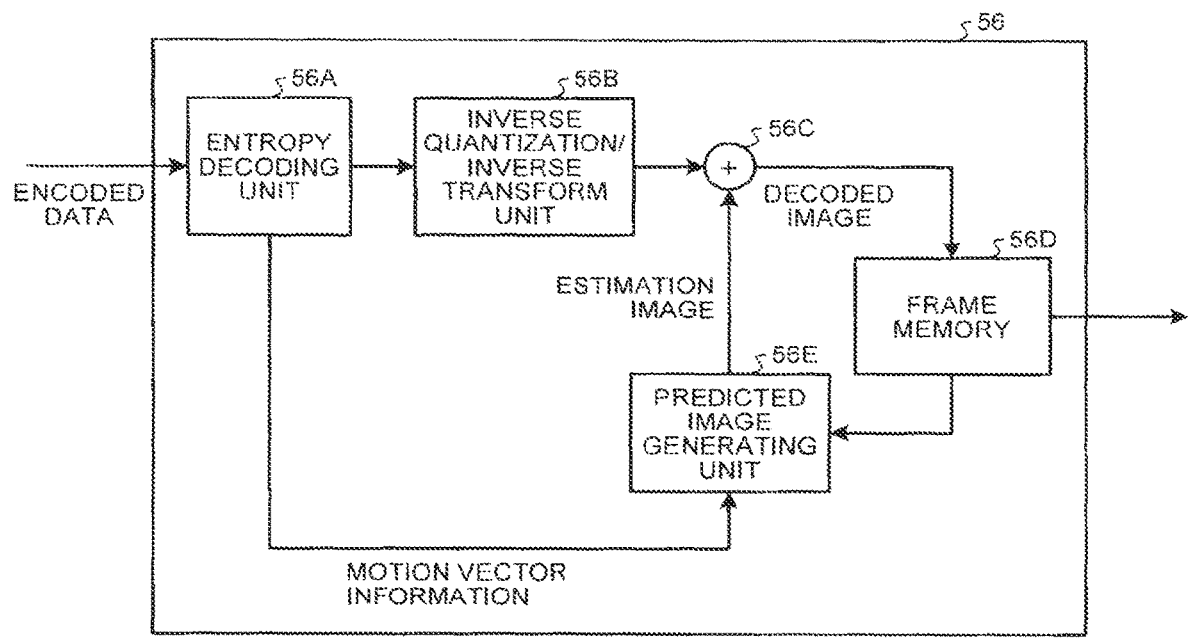
FIG. 26 is a schematic diagram illustrating another decoding unit in the decoding device according to the third embodiment.

FIG. 26 is a schematic diagram illustrating a functional configuration of the decoding unit 56.

As illustrated in FIG. 26, the decoding unit 56 includes an entropy decoding unit 56A, an inverse quantization/inverse transform unit 56B, an adding unit 56C, a frame memory 56D, and a predicted image generating unit 56E.

The entropy decoding unit 56A receives the encoded data from the NAL unit decoding unit 54. Then, the entropy decoding unit 56A performs entropy decoding with respect to the received encoded data according a predetermined syntax. As a result, the entropy decoding unit 56A obtains quantized coefficients and motion vector information.

Then, the entropy decoding unit 56A outputs the quantized coefficients to the inverse quantization/inverse transform unit 56B, and outputs the motion vector information to the predicted image generating unit 56E.

The inverse quantization/inverse transform unit 56B performs inverse quantization with respect to the quantized coefficients and then performs inverse transform to generate an error image. The adding unit 56C receives the error image from the inverse quantization/inverse transform unit 56B and receives a predicted image from the predicted image generating unit 56E. Then, the adding unit 56C adds the error image and the predicted image to obtain a decoded image. Subsequently, the decoded image is stored in the frame memory 56D, and is then output to the converting unit 60 and the predicted image generating unit 56E.

The predicted image generating unit 56E generates a predicted image by referring to the decoded image and the motion vector information. Then, the predicted image generating unit 56E outputs that predicted image to the adding unit 56C.

Returning to the explanation with reference to FIG. 24, the convening unit 60 receives the decoded image from the decoding unit 56. Moreover, the converting unit 60 receives the color-difference conversion information from the decoding unit 58. Then, the converting unit 60 reads the first color-difference format, the second color-difference format, and the filter information from the color-difference conversion information. Subsequently, the converting unit 60 makes use of the filter identified by the filter information and converts the resolution of the color-difference component of the decoded image represented by the first color-difference format. With that, the converting unit 60 converts the decoded image having the first color-difference format into a decoded image having the second color-difference format. Then, the converting unit 60 outputs the reproducible image, which is obtained by resolution conversion with respect to the color-difference component of the decoded image, to a reproducing device.

Figure 27:
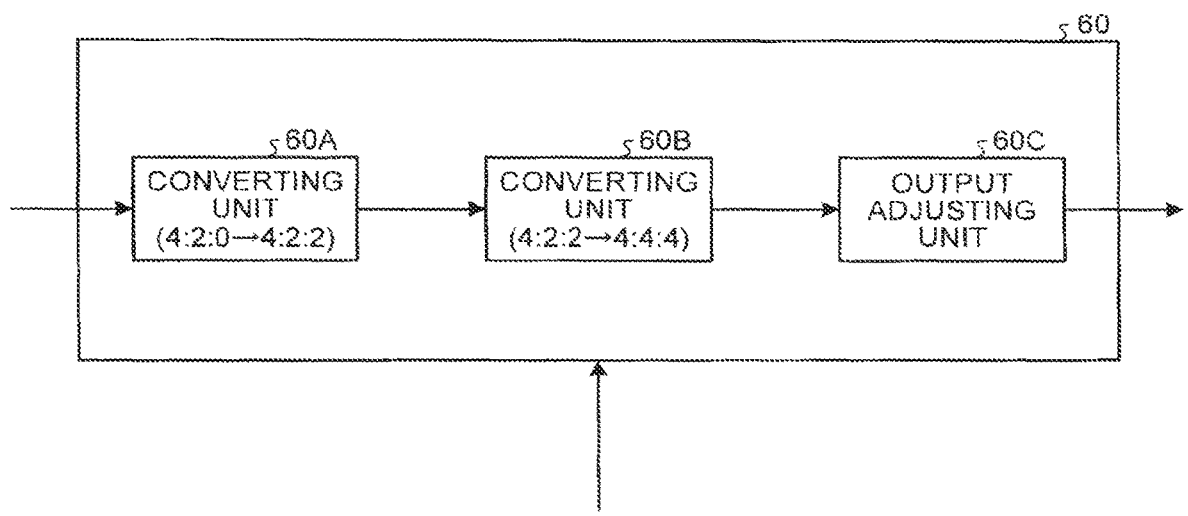
FIG. 27 is a schematic diagram illustrating a converting unit in the decoding device according to the third embodiment.

FIG. 27 is a schematic diagram illustrating the converting unit 60.

The converting unit 60 includes a converting unit 60A, a converting unit 60B, and an output adjusting unit 60C.

The converting unit 60A converts a decoded image having the 4:2:0 format into a decoded image having the 4:2:2 format. More particularly, from the color-difference conversion information received from the decoding unit 58, the converting unit 60A reads, as the filter information, the filter information used in filter processing performed by the converting unit 12B. Then, the converting unit 60A performs filter processing using the read filter information and converts a decoded image having the 4:2:0 format into a decoded image having the 4:2:2 format.

Then, the converting unit 60A outputs the decoded image, which has the 4:2:2 format obtained by means of resolution conversion, to the converting unit 60B. Subsequently, from the color-difference conversion information received from the decoding unit 58, the converting unit 60B reads, as the filter information, the filter information used in filter processing performed by the converting unit 12A. Then, the converting unit 60B performs filter processing using the read filter information and converts the decoded image having the 4:2:2 format into a decoded image having the 4:4:4 format. Then, the converting unit 60B outputs the decoded image, which has the 4:4:4 format obtained by means of resolution conversion, to the output adjusting unit 60C.

The output adjusting unit 60C either reads, from the color-difference conversion information, the pixel bit length at the time of output, the maximum value of the color-difference component at the time of output, and the minimum value of the color-difference component at the time of output; or performs a clipping operation with respect to the decoded image in such a way that the pixel bit length, the maximum value, and the minimum value according to the specifications of a predetermined color-difference format are satisfied. Then, the output adjusting unit 60C outputs the post-clipping decoded image as the reproducible image.

Given below is the explanation of a decoding operation performed in the decoding device 50.

Figure 28:
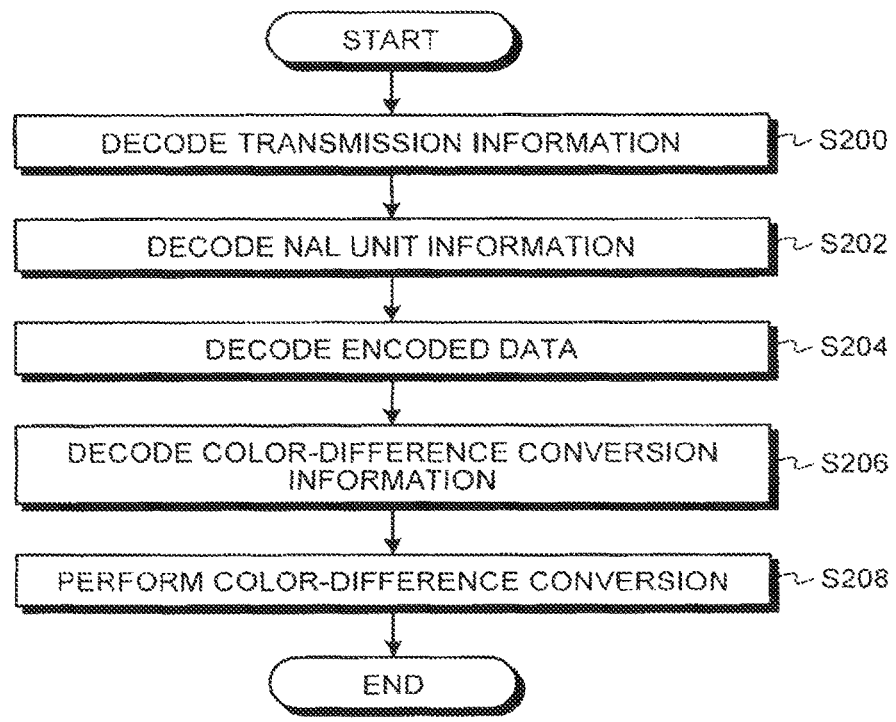
FIG. 28 is a flowchart of a decoding operation according to the third embodiment.

FIG. 28 is a flowchart of the decoding operation performed in the decoding device 50.

Firstly, the transmission information decoding unit 52 decodes the transmission information received from the encoding device 10 (Step S200). As a result of the operation performed at Step S200, the NAL unit information is obtained.

Then, the NAL unit decoding unit 54 decodes the NAL unit information obtained at Step S200 (Step S202). As a result of the operation performed at Step S202, the NAL unit decoding unit 54 obtains the encoded data, the color-difference conversion information, and the byte alignment information.

Subsequently, the decoding unit 56 decodes the encoded data received from the NAL unit decoding unit 54, and obtains a decoded image (Step S204).

Then, the decoding unit 58 decodes the color-difference conversion information (Step S206). As a result of the operation performed at Step S206, the decoding unit 58 reads the first color-difference format, the second color-difference format, and the filter information from the color-difference conversion information. Subsequently, to the converting unit 60, the decoding unit 58 outputs the color-difference conversion information that contains the first color-difference format, the second color-difference format, and the filter information.

Then, the converting unit 60 performs color-difference conversion to convert the decoded image received from the decoding unit 56 into a decoded image having the second color-difference format specified in the color-difference conversion information (Step S208). Subsequently, the converting unit 60 outputs the reproducible image, which is obtained by converting color-difference of the decoded image, to a reproducing device. That marks the end of the routine.

As described above, the decoding device 50 receives transmission information that contains color-difference conversion information and encoded data. Then, the decoding device 50 makes use of the filter that is identified by the filter information included in the color-difference conversion information; and converts the decoded image that has the first color-difference format and that is obtained by the decoding of the encoded data into a decoded image having the second color-difference format. With that, the decoding device 50 becomes able to suppress the image deterioration occurring due to resolution conversion.

Consequently, the decoding device 50 according to the third embodiment can suppress the image deterioration.

Fourth Modification

Given below is the explanation of the operations performed by the decoding unit 58 and the decoding unit 58A (see FIG. 25) in the case when the transmission information decoding unit 52 receives transmission information containing the color-difference conversion information illustrated in FIG. 8 from the encoding device 10.

In this case, the decoding unit 58A decodes the color-difference conversion information according to the syntax illustrated in FIG. 8.

As described above, in the color-difference conversion information illustrated in FIG. 8, chroma_loc_info_present_flag is a flag that indicates whether or not the pixel position of a color-difference signal is present and indicates whether or not the filter information related to color-difference conversion is present. When the value of chroma_loc_info_present_flag is "0", the decoding unit 58A assumes that neither the pixel position of a color-difference signal is present nor the filter information related to color-difference conversion is present, and thus skips the value of chroma_loc_info_present_flag. On the other hand, when the value of chroma_loc_info_present_flag is "1", the pixel position of a color-difference signal is present as well as the filter information related to color-difference conversion is present. Hence, in this case, the decoding unit 58A identifies the pixel sample position of the color difference according to the values indicated by chroma_sample_loc_type_top_field and chroma_sample_loc_type_bottom_field.

Moreover, as described above, chroma_filter_info_present_flag is a flag that indicates whether or not the filter information related to color-difference conversion is present. Thus, when the value of chroma_filter_info_present_flag is "0", it indicates that the filter information related to color-difference conversion does not exist. Hence, the decoding unit 58 skips the value of chroma_filter_info_present_flag. On the other hand, when the value of chroma_filter_info_present_flag is "1", it indicates that the filter information related to color-difference conversion is present. In that case, the decoding unit 58A reads, from the color-difference conversion filter definition information illustrated in FIG. 9 or FIG. 10, the identification information ("value") indicated by chroma_filter_info.

More particularly, from the color-difference conversion filter definition information illustrated in FIG. 9 or FIG. 10, the decoding unit 58A reads the following information corresponding to the identification information ("value"): the filter coefficients; the denominator while performing filter processing (i.e., "divisor"); the sample position of a color-difference pixel after filter processing (i.e., "phase shift"); and the usage of the filter information and the information on the second color-difference format (i.e., "purpose").

Meanwhile, as described above, the color-difference conversion filter definition information illustrated in FIG. 9 or FIG. 10 not only contains the filter coefficients used in color-difference conversion from the first color-difference format into the second color-difference format, but also contains the filter coefficients that were used in color-difference conversion from the second color-difference format into the first color-difference format in the corresponding encoding device.

More particularly, in the color-difference conversion filter definition information illustrated in FIG. 10, when the value of chroma_filter_info is "1", the decoding unit 58A follows the syntax illustrated in FIG. 11 and reads the value of target_format_idc representing the second color-difference format, reads the value of num_of_filter_minus1 representing the value smaller by one than the color-difference conversion filter count, and reads the value of filter_coeff representing the filter coefficients.

Then, the decoding unit 58A outputs the read values to the converting unit 60. The subsequent operations performed by the converting unit 60 are identical to the operations described above.

In this way, even in the case when transmission information containing the color-difference conversion information illustrated in FIG. 8 is received; in the decoding device 50, the filter identified by the filter information included in the color-difference conversion information is used to convert the color-difference format of a decoded image that is represented by the first color-difference format and that is obtained by decoding the encoded data. As a result, the decoding device 50 becomes able to suppress the image deterioration occurring due to resolution conversion.

Fifth Modification

Given below is the explanation of the operations performed by the decoding unit 58 and the decoding unit 58A (see FIG. 25) in the case when the transmission information decoding unit 52 receives transmission information containing the color-difference conversion information illustrated in FIG. 12 from the encoding device 10.

In this case, the decoding unit 58A decodes the color-difference conversion information according to the syntax illustrated in FIG. 12.

As described above, in the color-difference conversion information illustrated in FIG. 12, chroma_loc_info_present_flag is a flag that indicates whether or not the pixel position of a color-difference signal is present and indicates whether or not the filter information related to color-difference conversion is present. When the value of chroma_loc_info_present_flag is "0", the decoding unit 58A assumes that neither the pixel position of a color-difference signal is present nor the filter information related to color-difference conversion is present, and thus skips the value of chroma_loc_info_present_flag.

On the other hand, when the value of chroma_loc_info_present_flag is "1", the pixel position of a color-difference signal is present as well as the filter information related to color-difference conversion is present. Hence, in this case, the decoding unit 58A identifies the pixel sample position of the color difference according to the values indicated by chroma_sample_loc_type_top_field and chroma_sample_loc_type_bottom_field.

Moreover, chroma_filter_info_present_flag is a flag that indicates whether or not the filter information related to color-difference conversion is present. Thus, when the value of chroma_filter_info_present_flag is "1", the decoding unit 58A performs decoding according to the syntax of the color-difference conversion filter information illustrated in FIG. 13, FIG. 15, or FIG. 17.

The following explanation is given for a case when the decoding unit 58A performs decoding according to the syntax of the color-difference conversion filter information illustrated in FIG. 13.

As described above, num_of_filter_set_minus1 represents the value smaller by one than the filter set count, and indicates that loop processing is performed for a number of times equal to the filter set count. Moreover, implicit_filter_set_flag is a flag indicating that the information of a predefined filter set is used. When implicit_filter_set_flag is set to "1", the decoding unit 58A reads filter_set_idc that represents the identification information which is used to identify the information of the predefined filter set. On the other hand, when implicit_filter_set_flag is set to "0" the decoding unit 58A reads num_of_filter_minus1, which represents the value smaller by one than the color-difference conversion filter count, and implements the following loop of the color-difference conversion filter count.

As described above, implicit_filter_set_flag is a flag indicating that the information of a predefined filter set is used. When implicit_filter_set_flag is set to "1", the decoding unit 58A reads filter_idc that represents the identification information which is used to identify the predefined filter information. On the other hand, when implicit_filter_set_flag is set to "0", the decoding unit 58A reads tap_length_minus1 that represents the value smaller by one than the tap length of the filter coefficients. Then, the decoding unit 58A performs looping only for the tap length of the filter coefficients, and reads filter_coeff that represents the filter coefficient value.

Then, corresponding to filter_set_idc and filter_idc, the decoding unit 58A reads the following information of the predefined color-difference conversion filter definition information: the tap length of the filter coefficients (i.e., "tap length"); the filter coefficients (i.e., "filter coefficient"); the denominator while performing filter processing (i.e., "divisor"); the sample position of the color-difference pixel after filter processing (i.e., "phase shift"); and the usage of the filter information and the information on the second color-difference format (i.e., "purpose"). Meanwhile, in filter_set_idc, it is also possible to define the filter coefficients used in filter processing in the encoding device that corresponds to filter processing in the decoding device.

Subsequently, the decoding unit 58A outputs the read values to the converting unit 60. The subsequent operations performed by the converting unit 60 are identical to the operations described above.

In this way, even in the case when transmission information containing the color-difference conversion information illustrated in FIG. 12 is received; in the decoding device 50, the filter identified by the filter information included in the color-difference conversion information is used to convert the color-difference format of a decoded image that is represented by the first color-difference format and that is obtained by decoding the encoded data. As a result, the decoding device 50 becomes able to suppress the image deterioration occurring due to resolution conversion.

Sixth Modification

In the fifth modification, the explanation is given for a case in which the decoding unit 58A performs decoding according to the syntax of the color-difference conversion filter information illustrated in FIG. 14.

As described above, target_format_idc represents the second color-difference format; while chroma_format_idc represents the first color-difference format.

When the value of chroma_format_idc is equal to "1" and when the value of target_format_idc is greater than "1", or when the value of chroma_format_idc is greater than "1" and when the value of target_format_idc is equal to "1"; the decoding unit 58A reads the filter information in the vertical direction.

As described above, implicit_vertical_flag is a flag that indicates the use of predefined filter information in the vertical direction. When the value of implicit_vertical_flag is set to "1", the decoding unit 58A reads vertical_filter_idc that represents the identification information which is used to identify the predefined finer information in the vertical direction. On the other hand, when the value of implicit_vertical_flag is set to "0", the decoding unit 58A reads tap_length_vertical_minus1, which represents the value smaller by one than the tap length of the filter coefficients in the vertical direction, and reads ver_filter_coeff, which represents the vertical filter coefficients equivalent to the tap length.

Then, if the encoded data points to a field signal, the decoding unit 58A reads second_filter_flag that is a flag defined for a case when different filter sets in the vertical direction are used in the top field and the bottom field. If the value of second_filter_flag is equal to "1", the value of coded_format_idc is equal to "1", and the value of target_format_idc is greater than "1"; then it indicates that the second set of filter information is present.

If the value of implicit_vertical_flag is set to "1", then the decoding unit 58A reads second_vertical_filter_idc representing the identification information which is used to identify the second set of predefined filter information in the vertical direction. On the other hand, if the value of implict_vertical_flag is set to "0", then the decoding unit 58A reads tap_length_second_vertical_minus1, which represents the value smaller by one than the tap length of the second filter coefficient set in the vertical direction, and reads second_ver_filter_coeff, which represents the vertical filter coefficients equivalent to the tap length.

Meanwhile, when the value of chroma_format_idc is equal to "1" or "2" and when the value of target_format_idc is equal to "3", or when the value of chroma_format_idc is equal to "3" and when the value of target_format_idc is equal to "1" or "2"; the decoding unit 58A reads the filter information in the horizontal direction.

Herein, implicit_horizontal_flag is a flag that indicates the use of predefined filter information in the horizontal direction. When the value of implicit_horizontal_flag is set to "1", the decoding unit 58A reads horizontal_filter_idc that represents the identification information which is used to identify the predefined filter information in the horizontal direction. On the other hand, when the value of implicit_horizontal_flag is set to "0", the decoding unit 58A reads tap_length_horizontal_minus1, which represents the value smaller by one than the tap length of the filter coefficients in the horizontal direction, and reads hor_filter_coeff, which represents the horizontal filter coefficients equivalent to the tap length.

Subsequently, the decoding unit 58A identifies filter_idc, which is illustrated in FIG. 16, corresponding to vertical_filter_idc, second_vertical_filter_idc, or horizontal_filter_idc illustrated in FIG. 15. Then, corresponding to filter_idc that has been identified, the decoding unit 58A reads the following information of the predefined color-difference conversion filter definition information: the tap length of the filter coefficients (i.e., "tap length"); the filter coefficients (i.e., "filter coefficient"); the denominator while performing filter processing (i.e., "divisor"); the sample position of the color-difference pixel after filter processing (i.e., "phase shift"); and the usage of the filter information and the information on the second color-difference format (i.e., "purpose").

Subsequently, the decoding unit 58A outputs the read values to the converting unit 60. The subsequent operations performed by the converting unit 60 are identical to the operations described above.

In this way, even in the case in which decoding is performed according to the syntax of the color-difference conversion filter information illustrated in FIG. 14; in the decoding device 50, the filter identified by the filter information included in the color-difference conversion information is used to convert the color-difference format of a decoded image that is represented by the first color-difference format and that is obtained by decoding the encoded data. As a result, the decoding device 50 becomes able to suppress the image deterioration occurring due to resolution conversion.

Seventh Modification

In the fifth modification, the explanation is given for a case in which the decoding unit 58A performs decoding according to the syntax of the color-difference conversion filter information illustrated in FIG. 17.

When the value of chroma_format_idc is equal to "1" and when the value of target_format_idc is greater than "1", or when the value of chroma_format_idc is greater than "1" and when the value of target_format_idc is equal to "1"; the decoding unit 58A reads the filter information in the vertical direction.

More particularly, the decoding unit 58A reads tap_length_vertical_minus1, which represents the value smaller by one than the tap length of the filter coefficients in the vertical direction, and reads ver_filter_coeff, which represents the vertical filter coefficients equivalent to the tap length.

Then, if the encoded data points to a field signal, the decoding unit 58A reads second_filter_flag that is a flag defined for a case when different filter sets in the vertical direction are used in the top field and the bottom field. If the value of second_filter_flag is equal to "1", the value of coded_format_idc is equal to "1", and the value of target_format_idc is greater than "1"; then it indicates that the second set of filter information is present.

Hence, in this case, the decoding unit 58A reads tap_length_second_vertical_minus1, which represents the value smaller by one than the tap length of the second filter coefficient set in the vertical direction, and reads second_ver_filter_coeff; which represents the vertical filter coefficients equivalent to the tap length.

Meanwhile, when the value of chroma_format_idc is equal to "1" or "2" and when the value of target_format_idc is equal to "3", or when the value of chroma_format_idc is equal to "3" and when the value of target_format_idc is equal to "1" or "2"; the decoding unit 58A reads the filter information in the horizontal direction.

That is, the decoding unit 58A reads tap_length_horizontal_minus1, which represents the value smaller by one than the tap length of the finer coefficients in the horizontal direction, and reads hor_filter_coeff, which represents the horizontal filter coefficients equivalent to the tap length.

Then, the decoding unit 58A outputs the read values to the converting unit 60. The subsequent operations performed by the converting unit 60 are identical to the operations described above.

In this way, even in the case in which decoding is performed according to the syntax of the color-difference conversion filter information illustrated in FIG. 17; in the decoding device 50, the filter identified by the filter information included in the color-difference conversion information is used to convert the color-difference format of a decoded image that is represented by the first color-difference format and that is obtained by decoding the encoded data. As a result, the decoding device 50 becomes able to suppress the image deterioration occurring due to resolution conversion.

Eighth Modification

Given below is concrete explanation of a case in which the decoding device 50 receives transmission information that contains, as the filter information, the filter information used in filter processing performed by the converting unit 12 of the encoding device 10.

Figure 29:
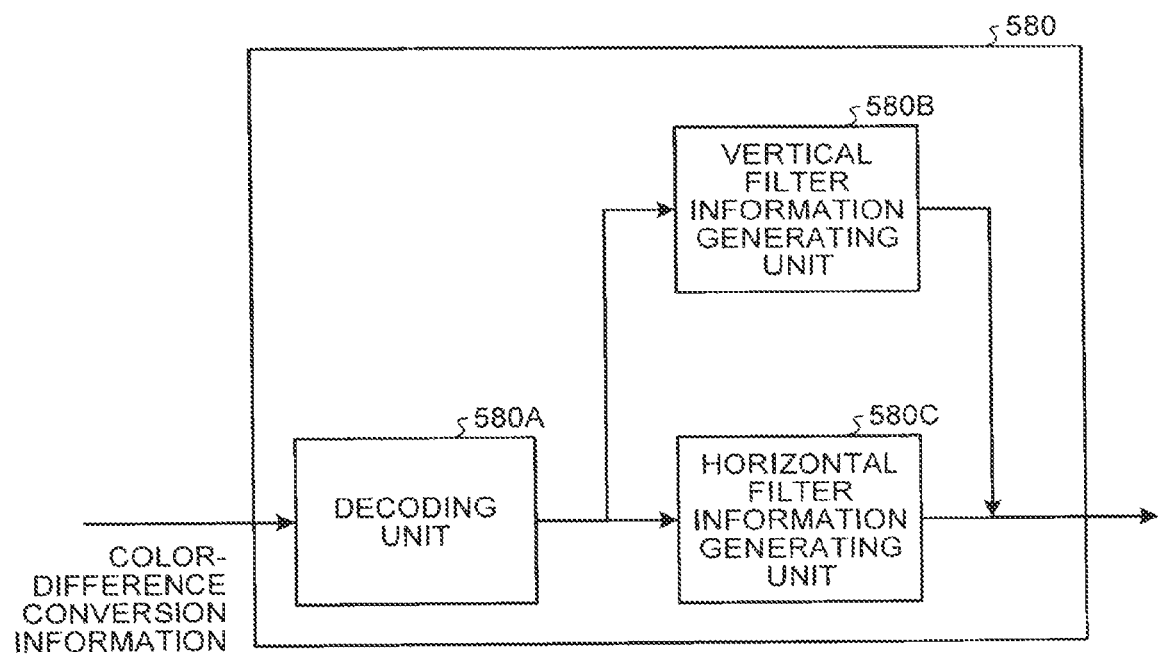
FIG. 29 is a schematic diagram illustrating a decoding unit according to an eighth modification.

In this case, the decoding device 50 can be configured to include a decoding unit 580 in place of the decoding unit 58, FIG. 29 is a schematic diagram illustrating the decoding unit 580. Herein, the decoding unit 580 includes a decoding unit 580A, a vertical filter information generating unit 580B, and a horizontal filter information generating unit 580C.

The decoding unit 580A analyzes the color-difference conversion information, and reads the first color-difference format, the second color-difference format, and the filter information from the color-difference conversion information. In the eighth modification, the filter information points to the filter information used in filter processing performed by the converting unit 12 of the encoding device 10. Moreover, in the eighth modification, the vertical down-sampling filter information and the horizontal down-sampling filter information is also included in the filter information.

From the vertical down-sampling filter information included in the filter information, the vertical filter information generating unit 580B generates vertical up-sampling filter information to be used in filter processing in the converting unit 60 of the decoding device 50. Similarly, from the horizontal down-sampling filter information included in the filter information, the horizontal filter information generating unit 580C generates horizontal up-sampling filter information to be used in filter processing in the converting unit 60 of the decoding device 50. Then, to the converting unit 60, the decoding unit 580 outputs the vertical up-sampling filter information generated by the vertical filter information generating unit 580B, the horizontal up-sampling filter information generated by the horizontal filter information generating unit 580C, and the color-difference conversion information containing the first color-difference format, and the second color-difference format.

Then, in identical manner to the third embodiment, the converting unit 60 reads the first color-difference format, the second color-difference format, and the filter information front the color-difference conversion information. Subsequently, the converting unit 60 makes use; of the filter identified by the filter information and converts the resolution of the color-difference component of the decoded image represented by the first color-difference format. With that, the converting unit 60 converts the decoded image having the first color-difference format into a decoded image having the second color-difference format. Then, the converting unit 60 outputs the reproducible image, which is obtained by resolution conversion with respect to the color-difference component of the decoded image, to a reproducing device.

In this way, regarding the filter information used in filter processing performed by the converting unit 60 of the decoding device 50, the filter information can be generated in the decoding device 50.

Meanwhile, assume that the filter information that is included in the color-difference conversion information generated by the decoding unit 58 or the decoding unit 580 contains vertical down-sampling filter information.

In such a case, the decoding device 50 is configured to include a converting unit 600 in place of the converting unit 60.

Figure 30:
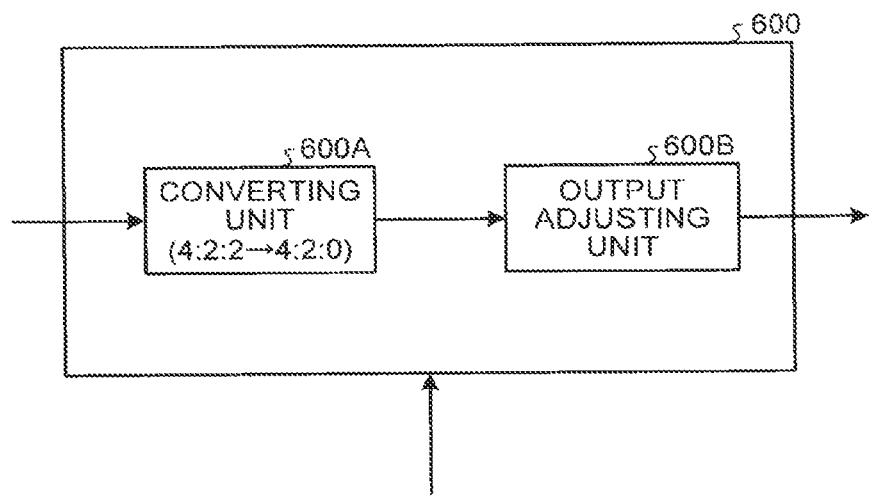
FIG. 30 is a schematic diagram illustrating a converting unit according to the eighth modification.

FIG. 30 is a schematic diagram illustrating the converting unit 600.

The converting unit 600 includes a converting unit 600A and an output adjusting unit 600B.

The converting unit 600A receives a decoded image having the 4:2:2 format from the decoding unit 56. Then, the converting unit 600A makes use of the vertical down-sampling filter information included in the filter information that is included in the color-difference conversion information received from the decoding unit 58 or the decoding unit 580, and converts the decoded image having the 4:2:2 format into a decoded image having the 4:2:0 format. That is, with respect to the color-difference component of each pixel constituting the decoded image having the 4:2:2 format, the converting unit 600A performs down-sampling for the purpose of decimating the color-difference component to half in the vertical direction. Then, the converting unit 600A outputs the decoded image having the 4:2:0 format to the output adjusting unit 600B.

The output adjusting unit 600B either reads, from the color-difference conversion information, the pixel bit length at the time of output, the maximum value of the color-difference component at the time of output, and the minimum value of the color-difference component at the time of output; or performs a clipping operation with respect to the decoded image in such a way that the pixel bit length, the maximum value, and the minimum value according to the specifications of a predetermined color-difference format are satisfied. Then, the output adjusting unit 600B outputs the post-clipping decoded image as the reproducible image to be reproduced.

Fourth Embodiment

Figure 31:
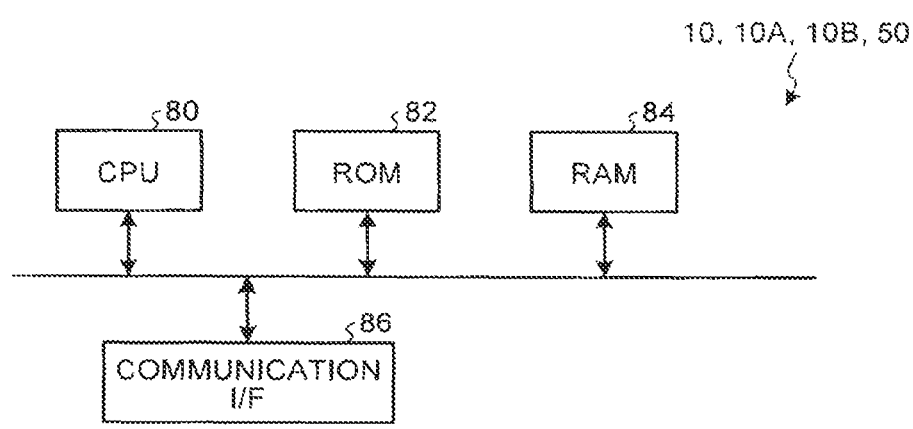
FIG. 31 is a block diagram illustrating a hardware configuration of the encoding devices and the decoding device according to the embodiments.

Given below is the explanation about a hardware configuration of the encoding device 10 the encoding device 10A, the encoding device 10B, and the decoding device 50. FIG. 31 is a block diagram illustrating a hardware configuration of the encoding device 10, the encoding device 10A, the encoding device 10B, and the decoding device 50.

Each of the encoding device 10, the encoding device 10A, the encoding device 10B, and the decoding device 50 according to the embodiments has the hardware configuration of a commonly-used computer in which a communication interface (I/F) 86, a central processing unit (CPU) 80, a read only memory (ROM) 82, and a random access memory (RAM) 84 are connected to each other by a bus.

The CPU 80 is a processor that controls the overall operations performed in the encoding device 10, the encoding device 10A, the encoding device 10B, or the decoding device 50. The RAM 84 is used to store the data required for various operations performed by the corresponding CPU 80. The ROM 82 is used to store computer programs used in implementing various operations performed by the corresponding CPU 80. The communication I/F 86 is an interface that establishes connection with an external device via a communication line, and sends data to and receives data from that external device.

Meanwhile, a computer program executed in the encoding device 10, the encoding device 10A, and the encoding device 10B for performing the encoding operation as well as a computer program executed in the decoding device 50 for performing the decoding operation is stored in advance in the ROM 82.

Alternatively, the computer program executed in the encoding device 10, the encoding device 10A, and the encoding device 10B for performing the encoding operation as well as a computer program executed in the decoding device 50 for performing the decoding operation may be recorded in the form of an installable file or an executable file in a computer-readable storage medium such as a compact disk read only memory (CD-ROM), a flexible disk (FD), a compact disk readable (CD-R), or a digital versatile disk (DVD); and can be provided as a computer program product.

Still alternatively, the computer program executed in the encoding device 10, the encoding device 10A, and the encoding device 10B for performing the encoding operation as well as a computer program executed in the decoding device 50 for performing the decoding operation may be saved as a downloadable file on a computer connected to the Internet or can be made available for distribution through a network such as the Internet.

Meanwhile, the computer program executed in the encoding device 10, the encoding device 10A, and the encoding device 10B for performing the encoding operation as well as a computer program executed in the decoding device 50 for performing the decoding operation contains a module for each of the respective constituent elements to be implemented in a computer. In practice, for example, the CPU 80 reads the computer programs from the corresponding ROM 82 and runs them such that the computer programs are loaded in a main memory device. As a result, the module tier each constituent element is generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. An encoding device comprising:
an encoder to generate encoded data;
a generator to generate first color-difference format information, second color-difference format information, and filter information, the first color-difference format information indicating a resolution of a color-difference component of the encoded data, the second color-difference format information indicating a resolution of a color-difference component used when reproducing a decoded image obtained by decoding the encoded data, the filter information indicating a configuration of a filter, the resolution of the color-difference component of each of the first color-difference format information and the second color-difference format information indicating a color-difference format of a 4:4:4 format, a 4:2:2 format, or a 4:2:0 format; and an outputter to output transmission information including the encoded data, the first color-difference format information, the second color-difference format information, and the filter information, wherein:

the filter information includes a filter identification.

2. An encoding method, comprising:

generating first color-difference format information, second color-difference format information, encoded data, and filter information, the first color-difference format information indicating a resolution of a color-difference component of the encoded data, the second color-difference format information indicating a resolution of a color-difference component used when reproducing a decoded image obtained by decoding the encoded data, the filter information indicating a configuration of a filter, the resolution of the color-difference component of each of the first color-difference format information and the second color-difference format information indicating a color-difference format of a 4:4:4 format, a 4:2:2 format, or a 4:2:0 format; and outputting transmission information including the encoded data, the first color-difference format information, the second color-difference format information, and the filter information, wherein:

the filter information includes a filter identification.

* * * * *